US008166308B2

(12) United States Patent
Smith et al.

(10) Patent No.: US 8,166,308 B2
(45) Date of Patent: Apr. 24, 2012

(54) SYSTEM AND METHOD FOR AUTHENTICATING A GAMING DEVICE

(75) Inventors: Keelan Smith, Toronto (CA); Scott A. Vanstone, Campbellville (CA); Daniel R. Brown, Mississauga (CA); Darryl L. Parisien, Toronto (CA); Ashok Vadekar, Rockwood (CA); Brian Neill, Burlington (CA)

(73) Assignee: Certicom Corp., Mississauga (CA)

( * ) Notice: Subject to any disclaimer, the term of this patent is extended or adjusted under 35 U.S.C. 154(b) by 1204 days.

(21) Appl. No.: 11/779,651

(22) Filed: Jul. 18, 2007

(65) Prior Publication Data

US 2008/0028235 A1   Jan. 31, 2008

Related U.S. Application Data

(60) Provisional application No. 60/831,472, filed on Jul. 18, 2006, provisional application No. 60/885,073, filed on Jan. 16, 2007.

(51) Int. Cl.
*H04L 9/32* (2006.01)
*G06F 12/14* (2006.01)
*G06F 17/00* (2006.01)

(52) U.S. Cl. ............... 713/180; 713/190; 726/2; 726/27; 463/29; 463/43

(58) Field of Classification Search ......................... None
See application file for complete search history.

(56) References Cited

U.S. PATENT DOCUMENTS

| 5,768,382 | A | * | 6/1998 | Schneier et al. | ............... 380/251 |
| 5,956,404 | A | * | 9/1999 | Schneier et al. | ............... 713/180 |
| 6,149,522 | A | | 11/2000 | Alcorn et al. | |
| 6,212,281 | B1 | | 4/2001 | Vanstone | |
| 6,959,384 | B1 | * | 10/2005 | Serret-Avila | ................... 713/176 |
| 7,134,021 | B2 | * | 11/2006 | Miyazaki et al. | ............. 713/178 |
| 7,827,397 | B2 | * | 11/2010 | McCoull et al. | ................... 713/2 |
| 2001/0046291 | A1 | | 11/2001 | Vanstone et al. | |

(Continued)

FOREIGN PATENT DOCUMENTS

EP   1083700 A2   3/2001
EP   1243999 A2   9/2002

OTHER PUBLICATIONS

"Standard Specifications for Public Key Cryptography: Pintsov-Vanstone Signatures with Message Recovery"; IEEE P1363a/D2 (Draft Version 2); Jan. 10, 2000; pp. 1 to 9; IEEE; retrieved from the internet May 19, 2010 from http://grouper.ieee.org/groups/1363/P1363a/contributions/PVSSR.pdf.

(Continued)

*Primary Examiner* — William Powers
(74) *Attorney, Agent, or Firm* — Brett J. Slaney; John R. S. Orange; Blake, Cassels & Graydon LLP

(57) ABSTRACT

A method and system are provided for authenticating and securing an embedded device using a secure boot procedure and a full non-volatile memory encryption process that implements Elliptic Curve Pinstov-Vanstone Signature (ECPV) scheme with message recovery on a personalized BIOS and master boot record. The signature includes code that is recovered in order to unlock a key that is in turn used to decrypt the non-volatile memory. The use of ECPVS provides an implicit verification that the hardware is bound to the BIOS since the encrypted memory is useless unless properly decrypted with the proper key.

63 Claims, 26 Drawing Sheets

U.S. PATENT DOCUMENTS

2002/0049909 A1    4/2002  Jackson et al.
2004/0006692 A1*  1/2004  Honda et al. .................. 713/157
2004/0259633 A1* 12/2004  Gentles et al. .................. 463/29
2006/0136708 A1*  6/2006  Hajji et al. ........................ 713/2
2008/0254850 A1* 10/2008  Sylla ................................ 463/16

OTHER PUBLICATIONS

Di Felice, M.; Supplementary Partial Search Report from corresponding European Application No. 07763915.1; search completed Aug. 11, 2010.

"ECC in Action: real-world applications of elliptic curve cryptography"; The Certicom "Catch the Curve" White Paper Series; Sep. 2004; Certicom Corp.

"An Elliptic Curve Cryptography (ECC) Primer: why ECC is the next generation of public key cryptography"; The Certicom "Catch the Curve" White Paper Series; Jun. 2004; Certicom Corp.

International Search Report from PCT/CA2007/001264 dated Nov. 21, 2007.

* cited by examiner

SYSTEM AND METHOD FOR AUTHENTICATING A GAMING DEVICE

This application claims priority from U.S. Provisional Application Nos. 60/831,472 filed on Jul. 18, 2006 and 60/885,073 filed on Jan. 16, 2007, the contents of which are incorporated herein by reference.

FIELD OF THE INVENTION

The present invention relates to systems and methods for authenticating data stored on a device and has particular utility in authenticating such content at run time.

DESCRIPTION OF THE PRIOR ART

Companies that develop, manufacture and sell personal computer (PC) based devices that run software programs and/or receive, play and/or distribute various types of multimedia content, but due to the physical limitations of the device and/or inability to force users to employ strong passwords at boot-up, wake-up etc., can face significant security challenges not only during use, but also during the device's entire lifecycle.

In many cases, the devices are destined for a consumer market where the devices become susceptible to hacking from various potential attackers both expert and unsophisticated. Companies are generally very concerned with security but it can be difficult to balance adequate security with usability and cost requirements. For example, high security measures during use that are not transparent to the user can be detrimental to usability. Also, high security during the manufacturing stage, e.g., keeping all manufacturing in-house, can be detrimental to the overall cost of producing, the product.

In general, there are three stages in the life of the device in which security should be of greatest concern: i) the manufacturing process; ii) the general operation of the device by its owner; and iii) the maintenance and repair of the device by technicians. It shall be noted that the user of the device may not necessarily be the owner of the content being handled by the device, e.g., a music file played on a satellite radio player.

Often, the production of the device is handled by one or more third parties. For example, a motherboard/microprocessor module designed by the company is manufactured and pre-programmed by a third party supplier. The end-product produced using the motherboard may itself be assembled at the company's facility or at the facility of another third party contractor. The assembly process is typically where operating systems, software applications and configuration data are programmed into the device before final testing and are vulnerable to cloning and other security breaches.

Data that is particularly sensitive is content security middleware that is used to enforce content security policies, e.g., digital rights management (DRM), at a later time, when the device is in operation. The security middleware and the device itself are vulnerable at all times, but especially so while the device is being manufactured, while it is deployed but turned off and while it is being serviced by a knowledgeable technician. In many cases, the content security middleware can be changed or altered during these times and thus the safeguards protecting the content are vulnerable to being circumvented which places the content and/or software applications of the device at a security risk.

There exists security tools and applications that attempt to protect a device when the device is booting up, and that address user authentication and disk encryption, however; these tools are typically not suitable for the applications described above due to their reliance on user-interaction at certain important points in the authentication process. Moreover, many of these security tools require or rely on the presence of a Smart Card, which is often too costly of a component for companies to include with the device. Therefore, as noted above, security and usability can be competing objectives. An important factor in the success of high-volume consumer electronic devices is that they are easy to use. As such, vendors of these devices wish to have security measures that are adopted by the device be transparent to the user.

Implementation issues have traditionally been a concern to companies, and, the protection of a device while booting up, encrypting file systems and implementing DRM policy engines to protect the device and the content used by the device are known. However, the established techniques often rely on the use of multiple complex software layers that need to co-exist and interoperate at multiple layers of the device, BIOS, O/S Kernel, O/S, drivers and application layers. The operation at multiple layers can be difficult to implement, is prone to the introduction of errors into the operation of the device, and can require a significant amount of additional code. Moreover, it is of paramount importance to companies that utilize these security measures that should a single device be compromised, the entire system is not susceptible to failure.

The above disadvantages are particularly prevalent in the gaming industry. Gaming machines such as slot machines include hardware and software for running the games, determining winners and controlling payouts. The software and hardware are prone to attacks whereby the software or hardware is swapped or modified to operate in a manner that is favourable to the attacker. As such, it is paramount that the integrity of the machine be maintained and the operation thereof be protected.

It is therefore an object of the following to obviate or mitigate the above disadvantages.

SUMMARY OF THE INVENTION

A system and method is provided for securing content included in a device and authenticating the content at run time.

In one aspect, a method for securing content to be used by a device is provided comprising preparing an encrypted image by encrypting at least a portion of the content such that the portion can be recovered by decrypting the encrypted image using a key; encrypting the key in a first signature component which permits the key to be recovered from the first signature component using information specific to the device; and making available to the device, a signature comprising the first signature component, to enable the device to recover the key from the first signature component using the information specific to the device and to decrypt the portion.

In another aspect, a method for authenticating content to be used by a device is provided comprising obtaining a signature comprising a first signature component encrypting a key that can be recovered therefrom; obtaining information specific to the device; recovering the key from the first signature component using the information specific to the device; and using the key to decrypt an encrypted image of at least a portion of the content to recover the portion; wherein if the portion is operable on the device, the content is implicitly authenticated.

In yet another aspect, a method for securing content to be used by a device is provided comprising designating a plaintext first portion of the content and a plaintext second portion of the content; encrypting the plaintext first portion to create an encrypted first portion; storing the encrypted first portion and the plaintext second portion on the device; and generating a signature including the encrypted first portion and the plaintext second portion as components thereof, wherein the signature can be used to recover the plaintext first portion from the encrypted first portion to enable the device to utilize the plaintext first portion.

In yet another aspect, a method for authenticating content to be used by a device is provided comprising obtaining a signature comprising an encrypted first portion of the content and a plaintext second portion of the content as components thereof utilizing the signature to recover a plaintext first portion from the encrypted first portion; and authenticating the content according to the plaintext first portion recovered from the signature.

In yet another aspect, a method for securing content to be used by a device is provided comprising designating a plurality of portions of the content; storing a first value on the device; generating a first signature on a first portion of the content, the first signature comprising a component which encrypts a second value such that the second value can be recovered using the first value; generating a second signature on a second portion of the content, the second signature comprising a component which encrypts a third value such that the third value can be recovered using the second value; and if more than two portions, generating other signatures that each include a component which encrypts a next value to be used by a next portion such that the next value can be recovered using a previous value recovered from a signature on a previous portion; wherein the first value can be used to recover the second value from the first signature, the second value can be used to recover the third value from the second signature and, if necessary, the next values are recoverable using the previous values, such that a final value recovered from a respective signature on a last of the portions can be compared with the first value to authenticate the plurality of portions simultaneously.

In yet another aspect, a method for authenticating content to be used by a device is provided comprising obtaining a first value stored on the device; obtaining a first signature on a first of a plurality of portions of the content, the first signature comprising a component which encrypts a second value; recovering the second value using the first value; obtaining a second signature on a second of the plurality of portions of the content, the second signature comprising a component which encrypts a third value; recovering the third value using the second value recovered from the first signature; if more than two portions, obtaining other signatures that each include a component which encrypts a next value and recovering the next value using a previous value recovered from a signature on a previous portion; and comparing a final value recovered on a signature on a last of the plurality of portions with the first value to authenticate all the plurality of portions simultaneously.

In yet another aspect, a method for downloading a new module for content to be used by a device is provided, the method comprising obtaining a signature on an entry module for a component of the content, the component comprising a plurality of modules, each comprising a signature, one of the plurality of modules being, the entry module and one of the plurality of modules being an end module, the signature on the entry module comprising a signature component which encrypts an intermediate value such that the intermediate value can be recovered using a value stored on the device, the signature on the end module comprising a signature component which encrypts a next value such that the next value can be recovered using the intermediate value, and if more than two modules exist in addition to the entry and end modules, other modules of the component having a signature which comprises a signature component which encrypts the intermediate value such that the intermediate value can be recovered using the intermediate value recovered from a respective signature on a previous module; recovering the intermediate value from the signature on the entry module; obtaining a signature on the new module, the signature on the new module comprising a signature component which encrypts the intermediate value such that the intermediate value can be recovered using the intermediate value; using the intermediate value recovered from the signature on the entry module to recover the intermediate value from the signature on the new module; obtaining the signature on the end module and using the intermediate value recovered from the signature on the new module to obtain the next value; using the next value as a key for a keyed hash function and applying the keyed hash function to another component of the content to obtain an authentication code; and comparing the authentication code to a stored authentication code previously generated on the another component to authenticate the new module and the content.

In yet another aspect, a method for securing data on a gaming machine is provided, the method comprising encrypting a portion of the data and storing an ECPV signature on the gaming machine, wherein verification of the ECPV signature enables the portion to be decrypted and used by the gaming machine.

In yet another aspect, a method for securing data to be used by a device is provided, the method comprising signing each of a plurality of components of the data to generate a plurality of ECPV signatures having a visible portion and a hidden portion, wherein the visible portion is the respective component of the data, and the hidden portion is a value that, when recovered, is used to recover a respective value in the next signature, and wherein a final value recovered from the respective signature on a final one of the plurality of components may be compared to an input value used to recover the respective value from a first one of the plurality of components to authenticate the data.

The above methods are particularly suitable where the device is a gaming machine.

BRIEF DESCRIPTION OF THE DRAWINGS

An embodiment of the invention will now be described by way of example only with reference to the appended drawings wherein.

DETAILED DESCRIPTION OF THE INVENTION

Figure 1:
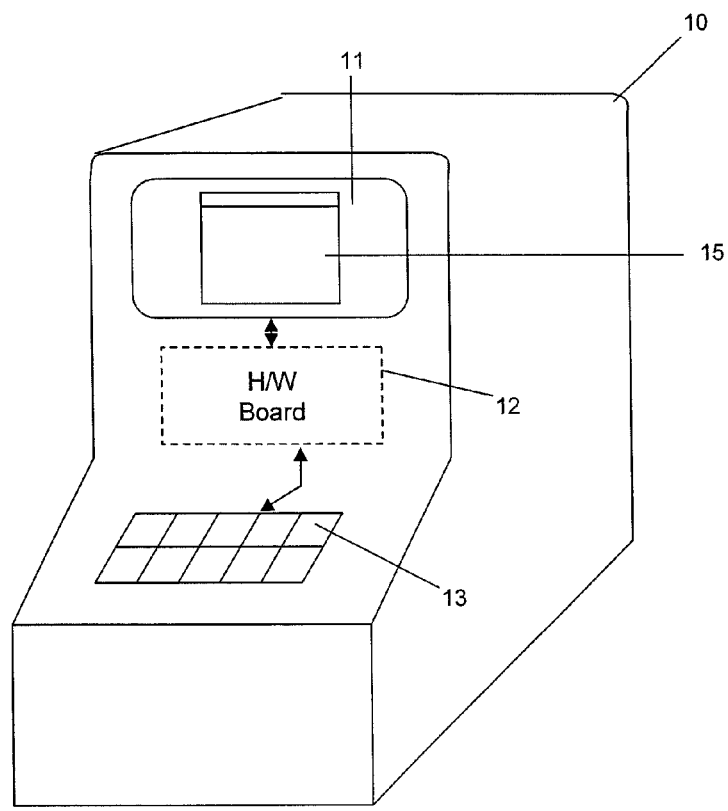
FIG. 1 is a perspective view of a gaming machine including a protected hardware board.

Referring to FIG. 1, a gaming machine 10 includes a display 11 for displaying game play using an application 15. The machine 10 also includes an input 13 for interacting with the game play according to what is displayed. A hardware (H/W) board 12 controls the game play on the display 11 according to user interaction with the input 13.

In order to protect valuable content, such as game code on the H/W board 12, the content is bound to the specific H/W board 12 at the time that it is manufactured.

Figure 9A:
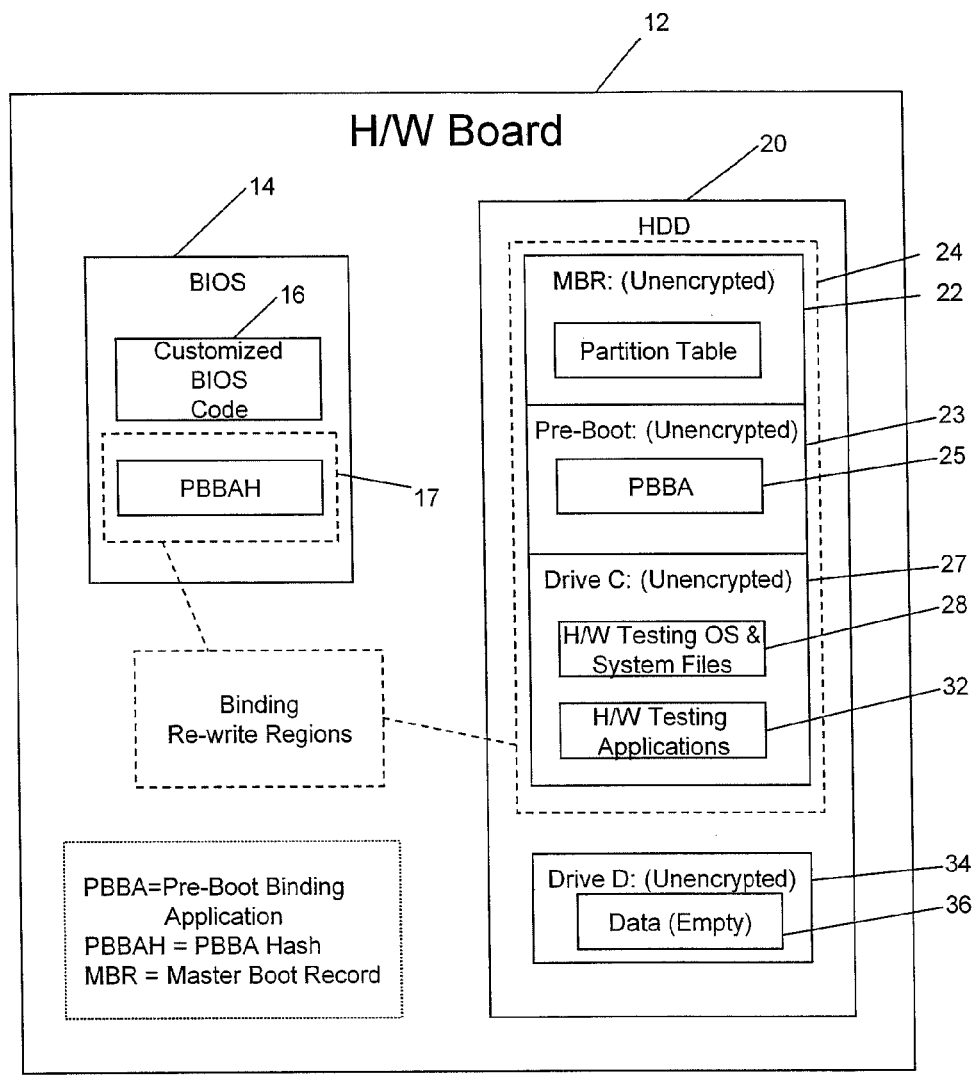
FIG. 9a is schematic block diagram of an unbound hardware board.

An unbound H/W board 12 is shown in FIG. 9a. The H/W board 12 has an a basic input output system (BIOS) 14 that is initially flashed with an unbound version of customized BIOS code (UBI) 16 to prevent the theft of unbound boards that are used to execute arbitrary code, especially during, a repair scenario. The H/W board 12 stores a pre-computed hash (PBBAH) of a pre-boot binding application (PBBA) in region 17. The PBBA is pre-stored in a pre-boot section 23 of a hard disk drive (HDD) 20. The dashed lines in FIG. 9a delineate the portions of the H/W board 12 that are re-written during the binding process that will be explained in detail below.

The HDD 20 is split into three fundamental sections, namely the pre-boot section 23, an application partition 27 (e.g. Drive C) and a data partition 34 (e.g. Drive D). The data partition 34 includes a data portion 36 for storing data. The pre-boot section 23 stores the PBBA in region 25. The PBBA handles the binding of the H/W board 12. The application partition 27 stores H/W testing operating system (OS) and system files 28 and H/W testing applications 32. The HDD 20 also includes a plaintext master boot record (MBR) 22. Preferably, the MBR 22 is not standard to prevent the HDD 20 from executing in any standard PC platform with a standard BIOS image 14. The MBR 22 includes an unaltered partition table 21 since the OS typically requires that this table 21 be in a recognizable format when it reads it from the HDD 20. As such, the partition table 21 is not encrypted. The boot loader (not shown) that resides in the MBR 22 reads the partition table 21 and jumps to the first bootable location on the HDD 20. The boot loader can be modified to prevent it from being executed by a standard BIOS image 14.

Separation of the three sections helps to speed up the binding operations since the sections 23 and 27 will take up much less space on the HDD 20 than the data partition 34 and thus generating an image of the sections 23 and 27 is generally faster than generating an image of the entire HDD 20. The separation of the sections 23, 27 and 34 may also help to simplify data recovery operations since data can be extracted directly from the data partition 34 rather than having, the possibility that the data 36 is mixed with the applications 32 in the application partition 27.

Figure 9B:
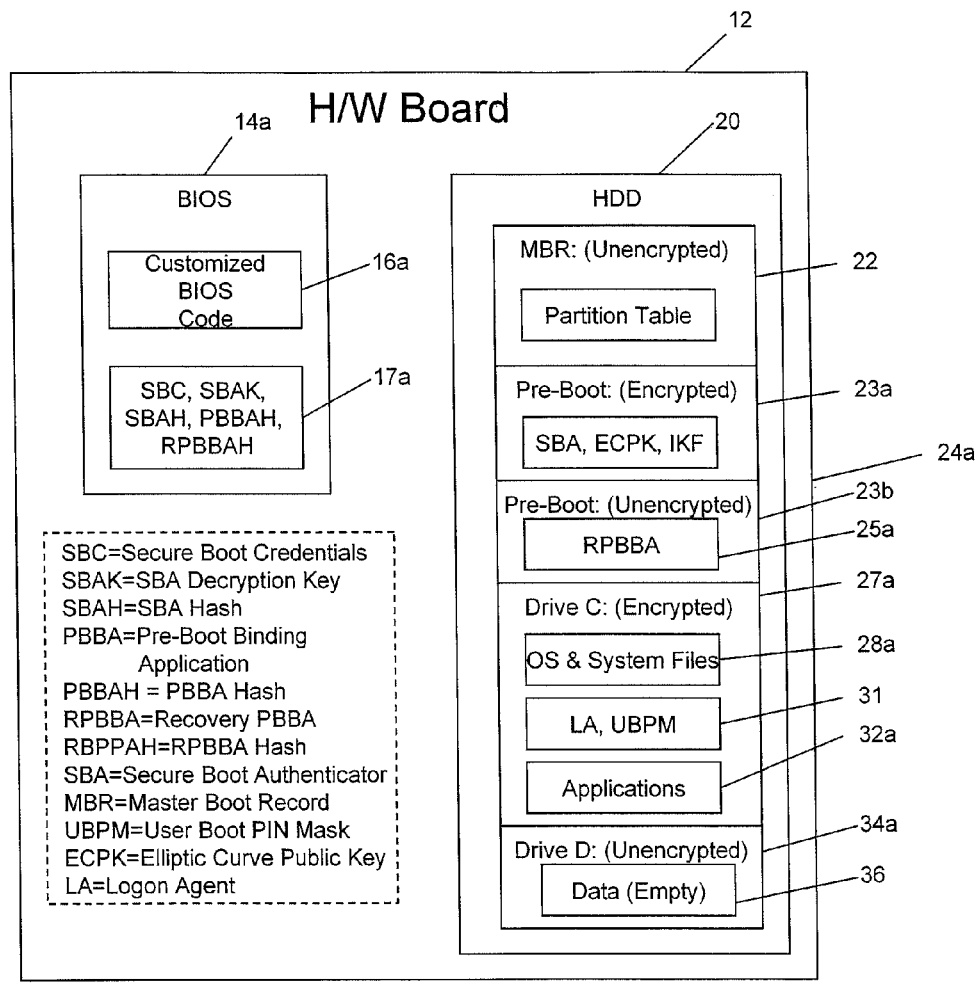
FIG. 9b is a schematic block diagram of a bound hardware board.

A bound H/W board 12 is shown in FIG. 9b wherein modified elements are given like numerals to FIG. 9a with the suffix "a". After the binding process, the H/W board 12 will contain a bound BIOS image (BBI) 14a and a fully protected HDD 20a.

The bound HDD 20a includes an unencrypted MBR 22 and partition table 21 as in FIG. 9a; and an encrypted pre-boot section 23a, which includes an encrypted secure boot authenticator (SBA), an elliptic curve public key (ECPK) and an image key file (IKF). Preferably, the encrypted SBA is stored in a known (and fixed) location on all systems so that the customized BIOS code 16a knows where to find it. The ECPK and the IKF are used by the SBA to verify the BIOS credentials and execute the OS. The IKF is a file that stores the image key (IK) that is recovered during the secure boot process as will be explained below. The HDD 20a also includes an unencrypted pre-boot section 23b that stores recovery PBBA code in a known and fixed location 25a. The RPBBA is plaintext code that allows the system to rebind the bound HDD image 24a to a new hardware board. There is no need to protect the RPBBA as it will not contain any sensitive information that could jeopardize the system.

The application partition 27a is encrypted when the H/W board 12 is bound and contains the OS and system files 28a, the applications 32a and a region 31 containing a logon agent (LA) and a user boot PIN mask (UBPM) used to validate a personal identification number (PIN) entered by a user. In one embodiment, the LA is referred to as GINAC, which is a customized version of an existing graphical identification and authentication DLL (GINA). The entire application partition 27a is encrypted with the IK.

It will be appreciated that if the data partition 36 is already protected by another mechanism, e.g., digital rights management (DRM), the data partition 36 may not be encrypted and may thus be plaintext. However, in this example, full disk encryption is utilized such that only the MBR 22 and pre-boot section 23b are in plaintext.

The BBI 14a includes a bound version of the customized BIOS code 16a and region 17a is modified such that it contains a number of items in addition to the PBBAH. These additional items include unique authentication credentials, in this embodiment referred to as secure boot credentials (SBCs) that are added to the BIOS image 14 firmware image at the manufacturing stage; a secure boot authenticator decrypt key (SBAK) that is used to encrypt and decrypt the SBA; a hash of the SBA (SBAH); and a hash of the RPBBA (RPBBAH).

The image 24a is cryptographically bound to the BIOS image 14a and other hardware components on the H/W board 12 by adding the SBC, preferably to the BIOS firmware image, during the manufacturing process. It is desirable to have binding occur after hardware testing has occurred, since, in a practical sense, there is no need to secure a broken or otherwise dysfunctional H/W board 12.

Figure 2:
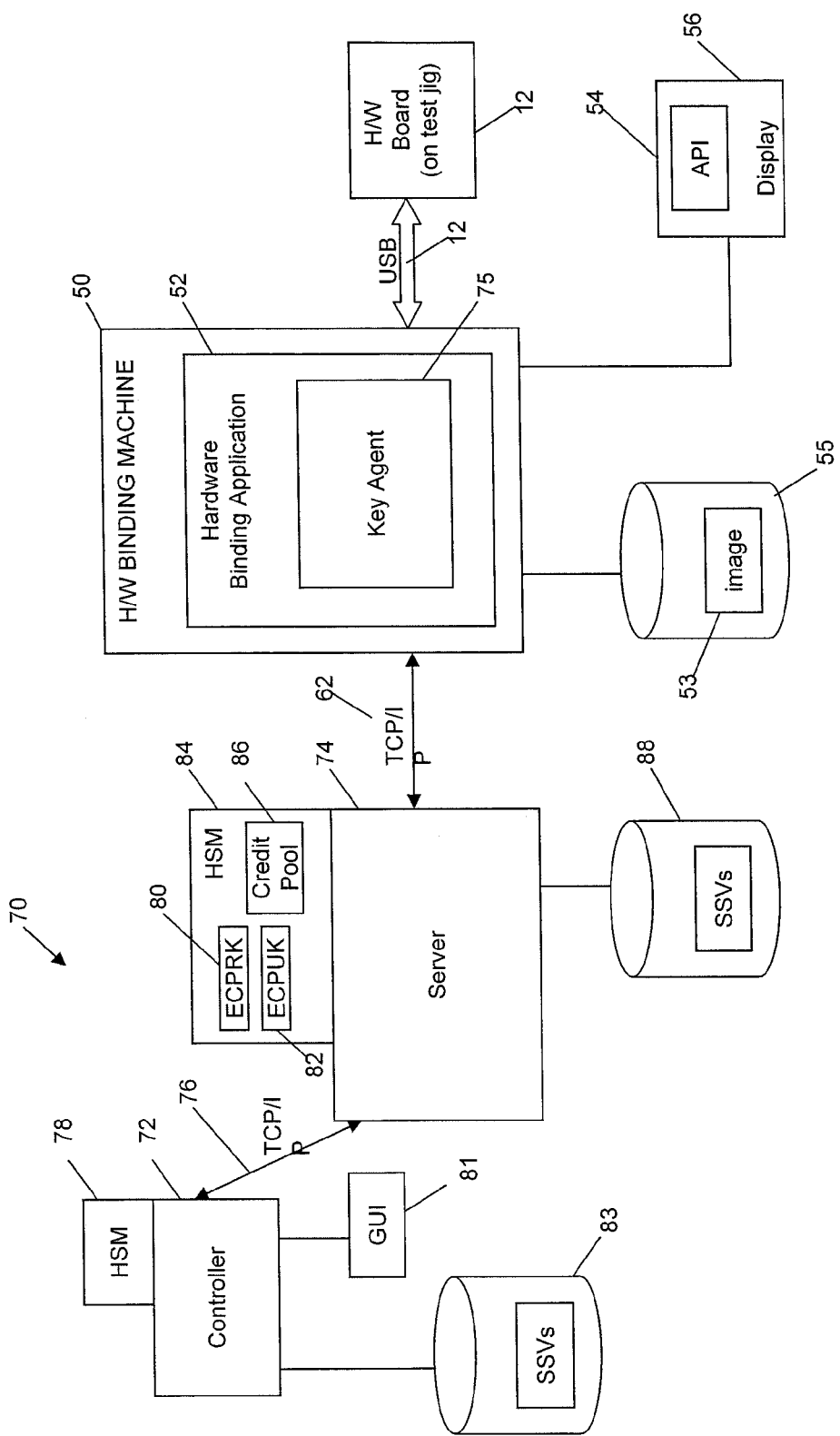
FIG. 2 is a schematic diagram of a secure binding system including the hardware board of FIG. 1.

As shown in FIG. 2, the H/W board 12 is bound using the interaction of several components preferably while it is in the testing jig. The binding is performed directly by a hardware binding machine (HBM) 50 that is preferably connected directly to the H/W board 12 via a universal serial bus (USB) connection 52. The binding process is accomplished indirectly using a key injection system (ICS) 70 that communicates with the HBM 50 via a secure network connection 62.

The KIS 70 comprises a controller 72 connected to a server 74 via another secure 23 network connection 76, and key agent software 75 included in a hardware binding application (HBA) on the HBM 50. The key agent (HBA) 75 establishes the secure connection 62 between the HBM 50 and the server 74.

The hardware binding application (HBA) 52 performs the binding operation and uses the IA 75 to establish a secure connection 62 with the controller 72. Typically, the HBM 50 includes a display 54 for providing an application program interface (API) 56 to enable a user to operate the HBM 50, e.g., using a laptop computer. In a practical sense, it is beneficial to avoid running other CPU-intensive applications during the binding procedure. The HBM 50 also stores an encrypted copy 53 of the image 24 in a data storage device 55. In one embodiment, the image 24 is encrypted with a key know only to the server 74. The HBA 52 obtains the key when securely connected to the server 74 and will re-encrypt the image 24 before sending to the H/W board 12. The HBM 50 is also responsible for returning the results of the binding operation to the server 74 so that the server 74 can return logging data to the controller. Preferably, there are two types of HBMs, one used by manufacturers for performing the binding procedure, and one used by technicians for repairing and upgrading the H/W board 12. The key shared between the server 74 and each manufacturer will preferably be the same and each technician will preferably use a different key.

The KIS 70 is a system that is used to remotely monitor device registration and to meter the injection of unique and immutable information into the device. A complete description of the KIS 70 is provided in co-pending U.S. patent application Ser. No. 11/450,418 filed on Jun. 12, 2006, the contents of which are incorporated herein by reference. In the present example, the controller 72 is a computer system that is remote to the manufacturer/testing facility and is preferably located at the company that produces the device and the server 74 is located at an outside manufacturer that has been contracted by the producer to manufacture, test and bind the H/W board 12. The producer may be a gaming company that produces and sells gaming machines 10 but contracts the manufacture of at least the H/W module to a third party.

The server 74 and the HBM 50 may or may not be at the same location and, if they are within the same physical location, the secure connection 62 may be established over a local network. As will be described in greater detail below, the IBM 50 is used to not only for the binding process but also used by technicians for repairs, maintenance and upgrades. As such, the HBM 50 may be connected to the H/W board 12 while it is in a gaming machine 10 on location at, e.g., a casino. Therefore, the relative physical locations of the server 74 and the HBM 50 can change so long as the secure connection 62 can be established enabling communication between the IBM 50 and the server 74.

The controller 72 comprises a hardware security module (HSM) 78, which is a protected device used by the controller 72 to perform cryptographically secure operations such as encryption, decryption and signing. A set of system security vectors (SSVs) is stored in a data storage device 83. Each SSV contains a set of values that will be unique to each bound H/W board 12. The set of values includes an SSV identifier (SSVID), a master boot PIN (MBP), an initial user PIN (IUP), the image key (IK) for the particular board 12, a system unlock code (SUC), and the SBAK. With the exception of the SSVID, all of the values are randomly generated. The SSVID is an integer value used to identify the SSV, which preferably increments by one for each SSV that is generated by the controller 72. The MBP is the PIN that is used to access the module when the user has forgotten their PIN. The IUP is the PIN that the user enters when they first power up the system if a pass-code-protection (PCP) option has been enabled prior to being shipped (or other user-password authentication scheme). If PCP has been disabled, the IUP is redundant as the user will be asked to enter a new PIN as discussed in greater detail below. As noted above, the IK is used to protect the image 24a, the SUC is used to protect the IK itself, and the SBAK is the key used by the BIOS 14a to protect the SBA process.

Blocks of SSVs are pre-computed by the controller 72 and sent securely to the server 74 on an as-needed basis. The server 74 caches a sufficient (configurable) number of SSVs to ensure that the server 74 does not need to communicate with the controller 72 during a production run, and to ensure that the server 74 does not run out of data during a run according to the principles described in co-pending application Ser. No. 11/450,418. The controller 72 can periodically poll the server 74 to determine if its cache of SSVs is low and automatically top-up the cache as necessary. The controller 72 can also gather logging information from the server 74 concerning the binding process. The controller 72 also comprises a graphical user interface (GUI) SI to enable a user to interact with the controller 72.

In one embodiment, the controller 72 is a Win32-based Windows service that executes continuously on a PC-based server machine, which contains the HSM and secure firmware. Requests made over the secure connection 76 can be established using a secure socket connection (SSL) wherein GUI 81 is an Apache Tomcat Java Servlet GUI. The interface allows for remote viewing of logging data from servers 74, as well as enabling an operator to set configuration settings in the KIS 70. The controller 72 also preferably includes provisions for loading keying data into the database 83 for later (or immediate) delivery to the server 74.

The server 74 comprises an HSM 84 that stores a credit pool 86 which dictates how many MBPs the server 74 has cached at any given time, an elliptic curve private key (ECPRK) 80 and a corresponding elliptic curve public key (ECPUK) 82. The server 74 stores the cache of SSVs in a data storage device 88. In one embodiment, the server 74 is a Linux-based daemon application that executes continuously on a PC-based server machine containing the HSM 84 and secure firmware. The server 74 receives SSL requests from the controller 72 to receive keying data and receives requests from the key agents 75 to securely deliver keying data for writing to devices. The server 74 contains access control measures to prevent unauthorized access to the system, e.g. a password or PIN code, but should also require minimal operator interaction once the system is deployed. The server 74 handles two types of requests, namely: 1) Requests from both types of HBMs to decrypt a new SSV from the cache 88; and 2) Requests from technician HBMs to retrieve an old SVV from the controller's database 83.

Figure 3:
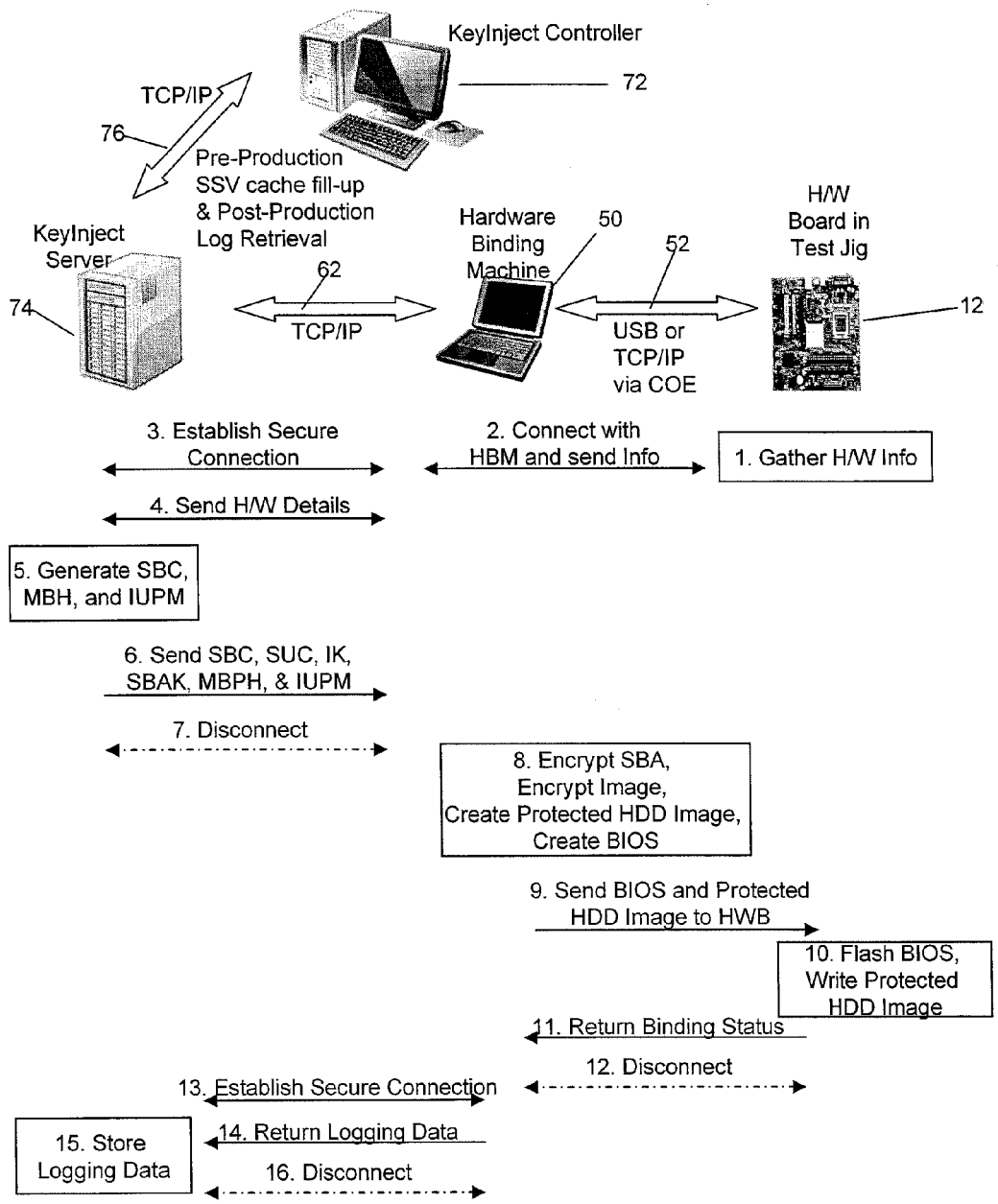
FIG. 3 is a flow diagram illustrating a secure binding procedure.

A flow diagram illustrating the steps in the binding process is shown in FIG. 3. As described above, the controller 72 performs a pre-production poll with the server 74 and top-up of SSVs, to ensure that the server 74 has a sufficient quantity of SSVs for that particular run. The controller 74 also performs post production log retrievals to gather information concerning the binding process. The log reporting procedures used by the KIS 70 are described in detail in co-pending, application Ser. No. 11/450,418.

Following the H/W testing process, preferably, the H/W board first gathers H/W information at step 1 that is used to further bind the pre-boot authentication process to the specific hardware such that the image 24 can only am on the hardware on which it was originally installed. This helps to prevent a legitimate image 24 from running on mimicked or cloned H/W and vice versa. The H/W information may include any combination of hardware specific, verifiable identifiers such as the HDD serial number, the H/W board serial number, the media 27 access control (MAC) addresses of the network interface cards (NICs), the BIOS serial number etc. Collectively, the H/W information is herein referred to as a HWSN. The H/W information can be combined and/or related to each other in any suitable manner to create the HWSN. For example, the identifiers can be concatenated and the resultant value hashed to produce the HWSN.

At step 2, the H/W board 12 connects to the HBM 50 via the USB connection 52 (or other direct-connect interface such as a dedicated cross-over Ethernet (COE) connection) and sends the H/W information to the HBM 50. The HBA 52 then establishes the secure connection 62 with the server 74 at step 3 using the key agent 75 (e.g. SSL) and sends a credentials request to the server 74 along with the H/W information at step 4. At step 5 the server 74 generates a number of values that are to be sent back to the HBA 52 over the connection 62 at step 6.

Figure 5:
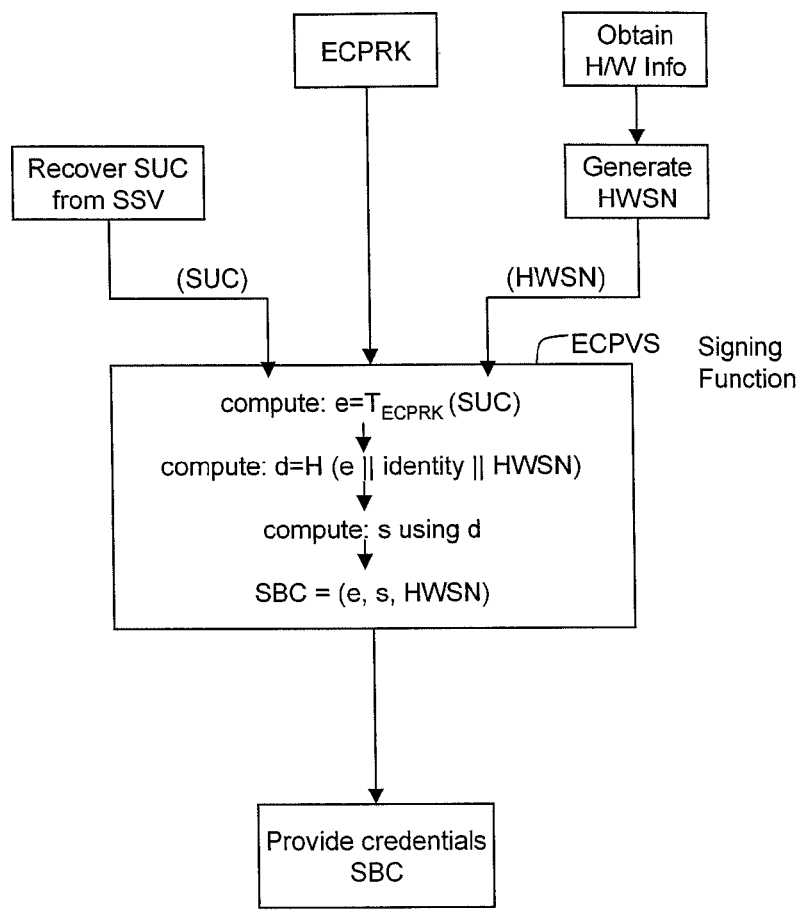
FIG. 5 is a flow diagram illustrating the generation of secure boot credentials using the Elliptic Curve Pinstov-Vanstone Signature Scheme.

At step 5 the server 74 first retrieves an SSV from the cache 88. From the SSV, the MBP is obtained and the server 74 calculates a hash of the MBP to create a master boot pin hash (MBPH). The server 74 also obtains the IUP from the SSV and calculates a mask of the IUP (IUPM). The server 74 also calculates the SBC using the HWSN and the SUC recovered from the SSV. Referring also to FIG. 5, the SUC is used by the server to calculate the SBC for the particular H/W board 12 that is undergoing the binding process. In the server's HSM 84, the SUC, the private key ECPRK and the hardware information HWSN are input into an Elliptic Curve Pinstov-Vanstone Signature (ECPVS) signing function.

A first signature component e is computed by encrypting the SUC with the private key ECPRK using a transformation T. An intermediate signature component d is computed by hashing the first signature component e, an identity of the server 74, and the HWSN; and a second signature component s is then computed using d. An ECPVS signature having components (e, s, HWSN) is generated which corresponds to the SBC.

At step 6, the SBC, SUC, INC, SBAK, MBPH and the IUPM are sent over connection 62 to the HBA 52 and the server 74 and key agent 75 are then disconnected from each other at step 7. At step 8, the HBA 52 will first obtain and decrypt a stored copy 53 of the image 24 and obtain and decrypt a copy of the SBA using keys previously supplied by the server 74. The HBA 52 will then re-encrypt the image 24 (and MBPH and IUPM) with the IK, and re-encrypt the SBA with the SBAK. The HBA 52 then generates the image 24a of both the encrypted SBA and the encrypted image 24. Finally, the HBA 52 then generates a BBI 16a that contains the newly created SBCs and the SBAK. At step 9, the HBM 50 sends the encrypted image 24a and the BBI 14a to the H/W board 12. The PBBA already executing on the H/W board 12 at step 10 flashes the BIOS 14 with the BBI 14a and writes the image 24a directly to the HDD 20. Finally, the ECPUK is compiled with and is thus part of the SBA code.

At step 11, the PBBA 26 returns a binding status message to the HBM 50 and the HBM 50 and the H/W board 12 are disconnected from each other at step 12. The HBM 50 then uses the key agent 75 to re-establish a connection with the server 74 at step 13 and prepare and send a log report pertaining to the binding operation (e.g. including SSVID) to the server 74 at step 14. The server 74 will then store the log report at step 15 for reporting to the controller 72, preferably at a later time (i.e. post production), and the server 74 and the key agent 75 are then disconnected from each other at step 16. The controller 72 communicates with database 83 to store all SSVs that have been sent to the server 74. When log reports are retrieved from the server 74 (e.g. by polling), the SSVID is recovered from the report to correlate the logging data back to a specific SSV in the database 83. The logs can also be adapted to include other information deemed necessary for auditing purposes, e.g., the HWSN provided in the request and the SBC generated in step 5.

It shall be noted that since the above described binding procedure involves the collection and use of specific information from various parts on the H/W board 12, preferably, binding should occur after all components have been assembled. As a further preference, the BIOS 14 should be programmed with a standard unbound BIOS image (UBI) after the H/W board 12 is populated and before hardware testing.

When the unbound H/W board is booted, the UBI will recognize itself as being unbound and attempt to execute the PBBA code from a know location on the HDD. The UBI 14 first calculates a hash of a known portion of the HDD that should include the PBBA code (if bound) and compares this with the PBBAH stored in the BIOS. If the hashes do not match the UBI will not allow the PBBA to execute.

Figure 4:
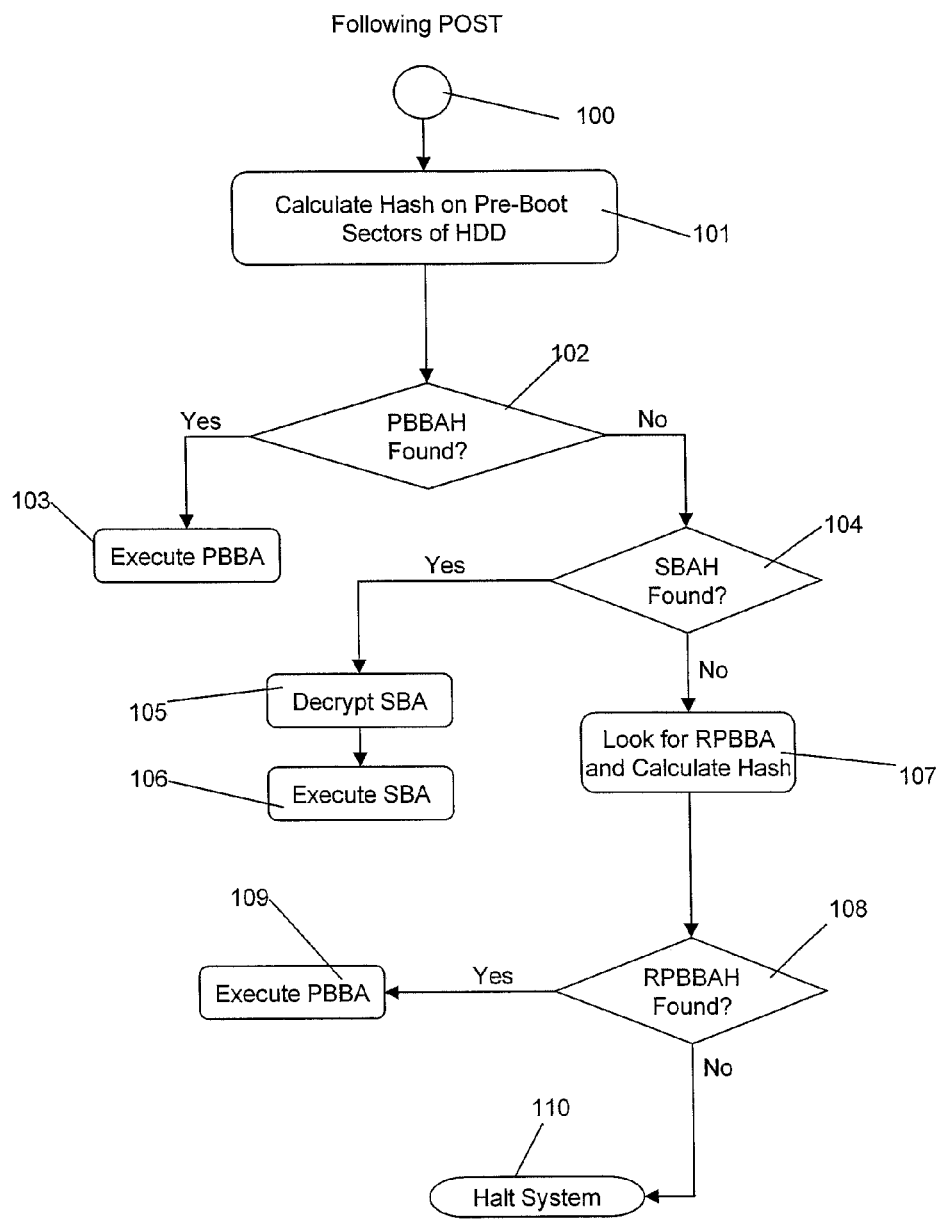
FIG. 4 is a flow diagram illustrating a BIOS loading procedure.

Referring now to FIG. 4, the secure boot procedure begins at step 100 following the normal power-up self tests COST). The BBI code 16a calculates a hash of the first N blocks (where N is the minimum byte size of the {PBBA, ESBA}) of the HDD 20 starting at the encrypted pre-boot sector 23a at step 101. The hash calculated at step 101 is compared to the PBBAH stored in region 17a at step 102. If the hash is equivalent to the stored PBBAH then the BBI 14a determines that the binding should take place, namely that the HDD image 24 is that of the PBBA and then executes the PBBA at step 103. If the hash does not match the PBBAH, BBI 14a then determines if the hash matches the SBAH stored in region 17a at step 104. If the hash is equivalent to the SBAH then the system is bound and the SBA is decrypted at step 105 using the SBAK also stored in region 17a and executes the SBA at step 106. If the hash does not match either the PBBAH or the SBAH, then the BBI 14a then looks in a known location 25a for the RPBBA and calculates a hash of that section at step 107. If this hash matches the RPBBAH stored in region 17a in step 108, the BBI 14a then executes the RPBBA code at step 109. If none of the hashes match, the system halts at step 110.

Figure 6:
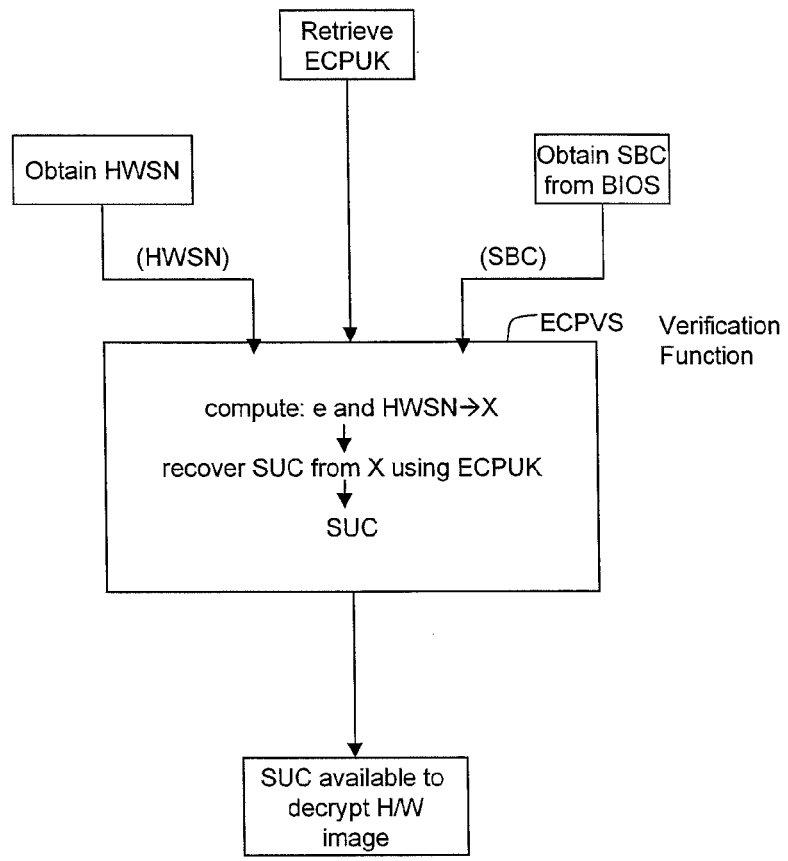
FIG. 6 is a flow diagram illustrating the verification of secure boot credentials using the Elliptic Curve Pinstov-Vanstone Signature Scheme.

Step 106 is shown in greater detail in FIG. 6. At step 111, the SBA is booted from the BBI 14a. The SBA then retrieves the public key ECPUK 82 and gathers the HWSN and SBC at step 112. If the SBC cannot be found at step 113, the system is halted at step 114. If the SBCs are found, the SBA attempts to validate the H/W board 12 at step 115 and recover the SUC.

Referring also to FIG. 6, the SBA uses an ECPVS verification function to validate 21 the H/W board 12 by first combining signature component e (included in SBC) with the HWSN to produce an intermediate value X. The verification function then uses the public key ECPUK 82 to recover SUC from X. If this fails, the system halts at step 114. If the SUC is recovered, the SUC is used to unlock the IK from the IKF, wherein if the image 24a is successfully decrypted at step 116, the OS will boot at step 118 and thus the H/W board 12 is implicitly verified. The IK is placed in memory at step 117. If the decryption at step 116 fails, i.e. the resultant image is useless, then the system shuts down at step 114. Therefore, if the hardware is original but the BIOS 14 has been swapped and credentials not bound to the hardware are used then the SBA will not be able to properly decrypt the image 24a. The same is true if the hardware has been swapped but not the BIOS since the proper HWSN is required to obtain the correct SUC to unlock the IK.

The image 24a is encrypted and decrypted using an image encryption/decryption driver (IEDD) inserted in a crypto interface layer in the OS low-level disk access routines. The IEDD uses a strong, symmetric key algorithm for cryptographic protection of the image 24 (e.g. the 128-bit AES standard). The IEDD has access to the IK while it is stored in memory.

Figure 7:
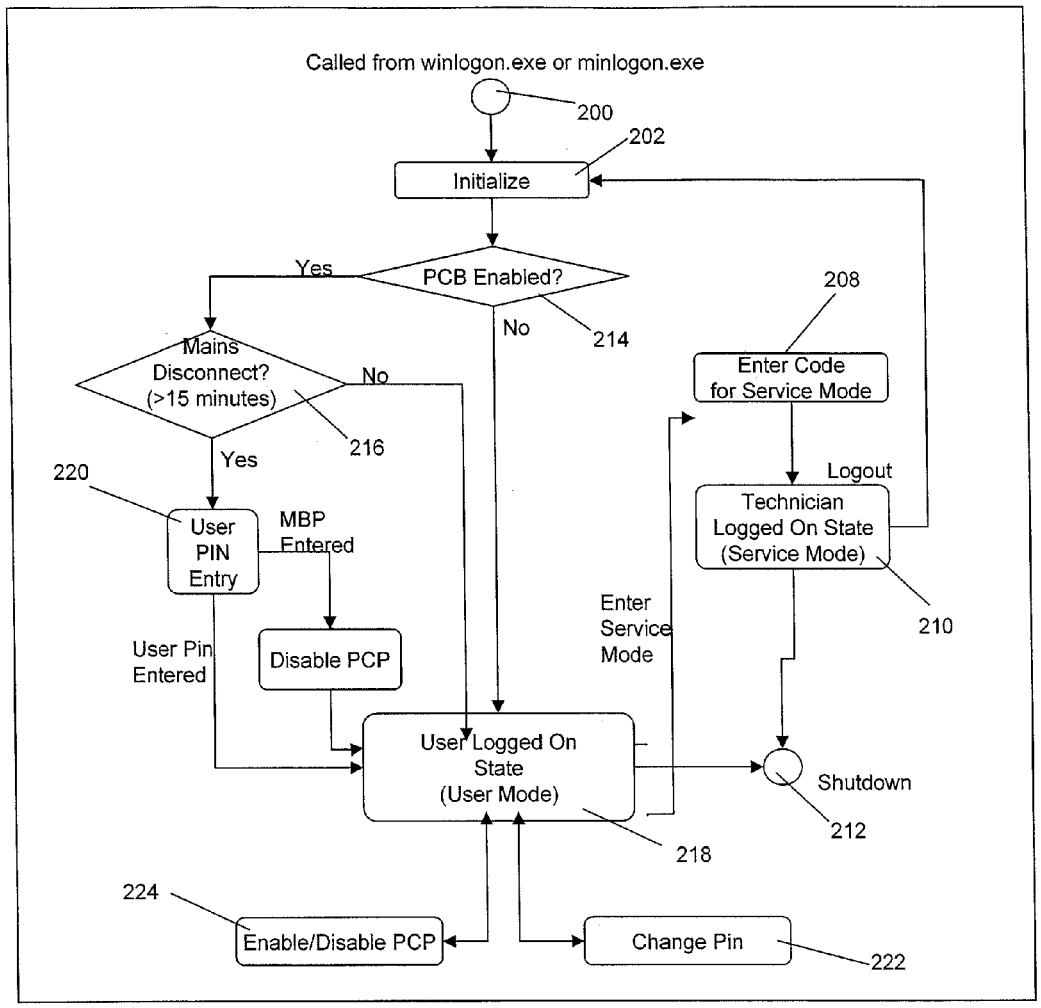
FIG. 7 is a flow diagram illustrating a user authentication sequence.

Referring now to FIG. 7, when the OS 28 boots, it will enter its own authentication sequence at steps 200 and 202 to identify and authenticate an operator of the system using the LA, e.g. by running GINAC. The mechanism that enforces the identification and authentication is typically either winlogon.exe or minlogon.exe (a stripped down version of winlogon.exe), depending on the configuration of the OS. The winlogon.exe version of the LA can be customized by replacing the GINA DLL as discussed above to obtain GINAC also discussed above. However, if the minlogon.exe is used, since it contains no GINA DLL, the system should be designed such that the LA is executed immediately upon shell execution or at another appropriate instance that ensures that the LA is not circumvented.

After the LA is initialized at step 202, the LA determines at step 214 whether or not PCP is enabled. If PCP is not enabled then the user is logged on and the system enters a logged-on-state at step 218. However, if the gaming machine 10 is PCP enabled, the LA determines if the power supply has been removed from the machine 10 within a certain duration of time (e.g. minutes) at step 116. If the power supply has not been disconnected during the specified time period then the user logged-on-state 218 is initiated. If the power supply has been disconnected within the specified time period a user PIN entry process is initiated at step 220. Either at the time of logging in or while the user is logged on, the PIN can be chanced by entering the MBP at step 222. During the user mode at step 218, the PCP can be enabled or disabled by the user at anytime at step 224 or the system shut down at step 212.

It will be appreciated that the use of a PCP scheme for user authentication is only one exemplary scheme. For example, a normal user-password or challenge-response could also be used whereby multiple users each having their own username and password can be authorized to enter the system through the LA.

Figure 8:
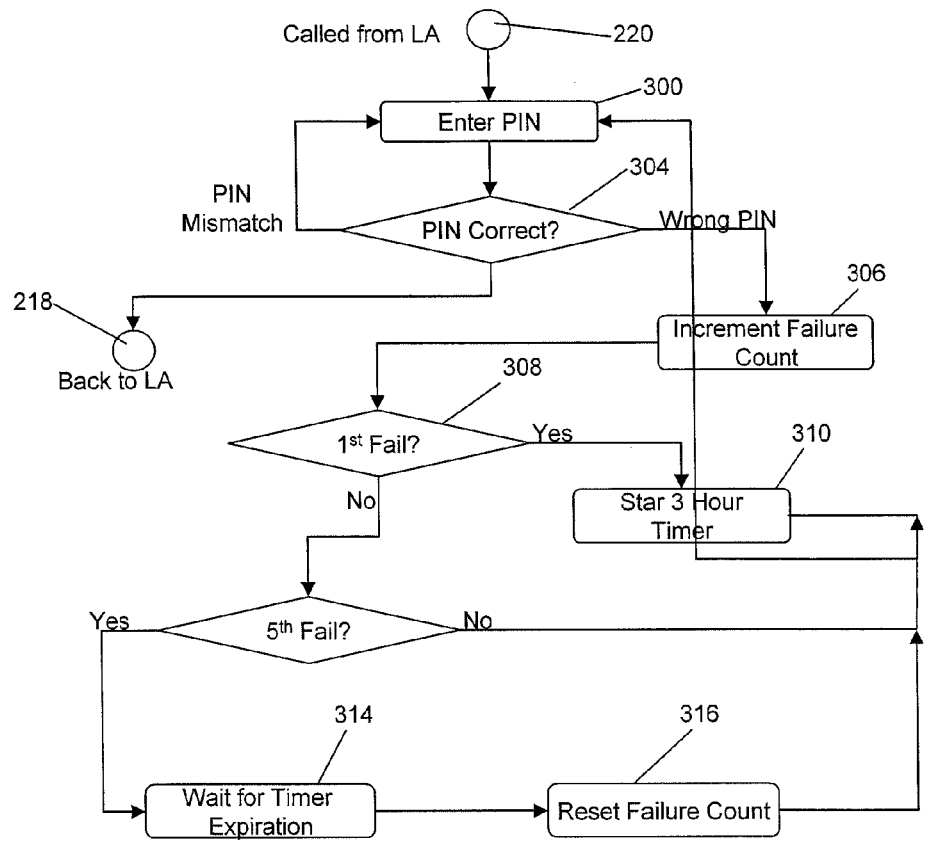
FIG. 8 is a flow diagram illustrating a user PIN entry process.

The user PIN entry performed at step 220 is shown in greater detail in FIG. 8. After step 220 initiates, the user is requested to enter their PIN at step 300. When a PIN is assigned, a user boot PIN mask (UBPM) is stored such that the following is satisfied:

MBP=PIN⊗UBMP. When XORing the entered PIN with the stored UBPM, the resulting MBP is hashed and compared with the stored MBPH value received from the server 74 during binding. When the user changes their PIN at step 222, UBPM is changed so that the original MBP does not need to be changed.

The UBPM 31 is derived from the IUPM sent in the SSV from the controller 72. The IUP is communicated to the user when they purchase the gaming machine 10. Preferably, when the gaming machine 10 is powered up, the PCP is enabled by default so that the user must enter their PIN in order to run the gaming machine 10, to change the assigned PIN, or to disable PCP. If the user disables PCP at step 224 then the gaming machine 10 does not require the user to undergo step 220 in order to enter the user mode at step 218 as explained above.

If the PIN is correct at step 304, the user will enter the user-logged-on state 218. If the PIN is incorrect, a failure counter is incremented by one at step 306 and the PCP determines whether or not this was the first failed attempt. If so, a timer, e.g. 3-hour timer is started at step to provide a limited window for the user to attempt entering the PIN. If not, the PCP determines whether or not it was the fifth failed attempt. If not then the user can enter the PIN again within the time allotted. If it is the fifth failed attempt then the user cannot enter the PIN again until the timer expires during step 314 whereby the failure counter is reset at step 316 and returns to step 300.

When the user-logged-on state is initiated and a service mode selection is made at step 208, preferably at the same time, a technician challenge-response procedure is initiated at step 210. When a technician is operating on the machine 10, a technician HBM 50a is connected via a USB connection 52a to the H/W Board 12. The H/W Board includes a challenge response client (CRC) 92 that is used to control the challenge-response procedure in conjunction with a challenge response server (CRS) 90 at the server 74.

Preferably, the technician selects a menu item in the operating unit (e.g. gaming machine 10) to enter the service mode. When the mode is selected, the LA will initiate a challenge-response as exemplified below.

Figure 10:
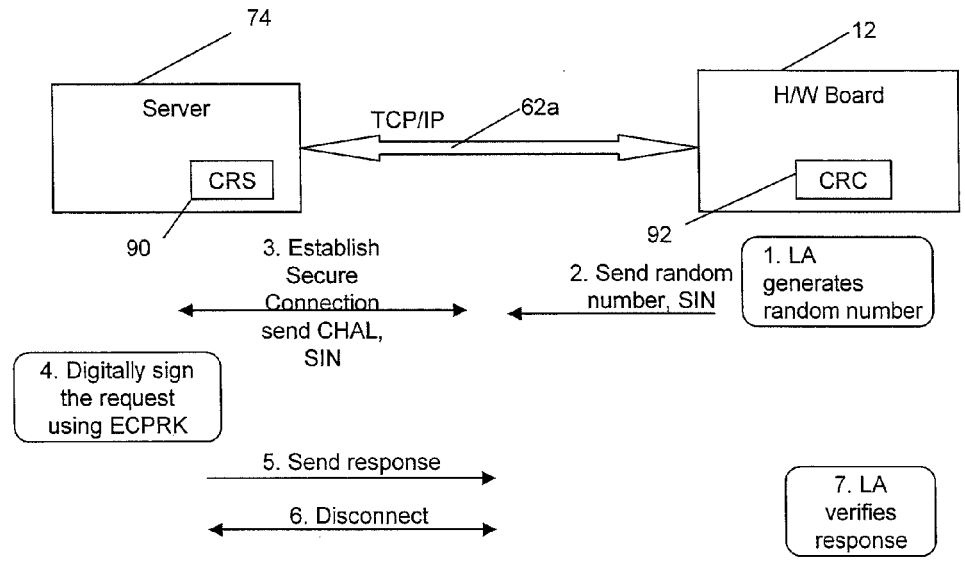
FIG. 10 is a flow diagram illustrating a service technician authentication sequence.

In the example shown in FIG. 10, the LA will first generate a challenge (CHAL) using a random number at step 1. The LA then sends the CHAL and a system identifier (SIN) to the CRS 90 at step 2 after establishing a secure connection 62a with the CRS 90 at the server 74 (e.g. via a webpage) and sends the CHAL and SIN at step 3. The CRS 90 inputs the CHAL, the SIN and the private key ECPRK to the ECPVS signing function to obtain a response value RESP which is then provided to the technician. The response is produced at step 4 by computing a first signature component by encrypting the CHAL with the private key ECPRK, computing an intermediate signature component by hashing a combination of the first component, an identity of the server and the SIN, and computing a second signature component using the intermediate signature component, wherein the two components plus the SIN is the signature which is used as the response RESP.

The CRS 90 sends the RESP to the CRC 92 at step 5 (e.g. for display) and the server is disconnected from the CRC 92 at step 6. The LA then verifies the RESP at step 7. It will be appreciated that the connection between the CRC 92 and the CRS 90 may also be accomplished using the HBM 50 if the technician is already connected to the H/W board 12

The LA uses the ECPVS verification function to combine the first signature component with the SIN to obtain a value X. The CHAL is then recovered from X using the public key ECPUK that is retrieved from the SBA. The LA then compares the recovered CHAL to that which it originally created to verify that the CHAL was signed by the server 74 only. If the challenge response verifies then the system enters a service mode at step 210 until the service is complete and the system shuts down at step 212.

There are several possible scenarios where a technician needs to gain access to the H/W board 12. In one scenario, the HDD is damaged and needs to be replaced. The technician in this case would reprogram the BIOS to the standard, unbound BIOS image that would exist before the binding process described above is implemented. The technician installs a new HDD with a standard production image into the board. When the system is re-booted, it will attempt to contact the HBM 50 to perform cryptographic binding. For this to occur, the HBM 50 will communicate with the server 74. The HBM application can exist on the same device that establishes this communication, e.g. key agent 75 or HBA 52. Once the binding completes successfully, the system will have new credentials and a newly encrypted image 24. Alternatively, the technician can replace the system with a pre-bound H/W board-HDD pair.

In another scenario, the BIOS 14 is damaged and thus the H/W board 12 will most likely need to be replaced. Similar to the scenario above, if the technician replaces the H/W board 12 and inserts the user's HDD 20, the secure boot authentication process will assume that the hardware is unbound since it will be unable to locate the SBCs and enter the binding process.

In yet another scenario, both the H/W board 12 and the HDD 20 are damaged and the user requires a completely new system. If the technician is able to connect to the server 74, then they can install a new H/W board and HDD and using the binding procedure described in the first scenario described above. If it is not possible to perform the binding operation on-site because the technician cannot connect to the server 74, then a pre-bound H/W board 12 and HDD 20 can be installed similar to the alternative discussed above. To inhibit the illegitimate used of the pre-bound system, the user PIN can be unknown to the service technician. When the new system is first powered up, the technician will have to enter the service mode (described above) to perform testing on the bound system. The user will then obtain the new PIN from the manufacturer or producer in order to authenticate and operate the machine 10.

In yet another scenario, the software in the image 24 is corrupted in some way. When a service technician needs to access the H/W board 12 to repair the software, they will enter the service mode wherein the service mode provides a toolkit for the technician to perform various software recovery or re-installation applications. If the OS 28 or the application software 32 has become corrupt beyond the ability to repair it using the service mode, the technician can follow the above steps to replace a damaged HDD 20 or replace both the H/W board 12 and the HDD with a pre-bound pair as also described above.

Authorization of a particular technician to perform the challenge response can be controlled by an authentication procedure that is used to log the technician into manufacturer's or producer's network. Other mechanisms could also be used to ensure that a particular system is allowed to be serviced, such as providing an enabling feature to the CRS 90. For example, an owner of the gaming machine 10 can contact the producer in any suitable manner and request to have the machine 10 serviced. An operator authorizes servicing for that particular gaming machine 10 (or system of gaming machines) by setting a flag in a customer database. At some time later when a technician logs onto the producer's network and connects to the CRS 90, the CRS 90 contacts the server 74 in order to look up the SIN in the customer database to verify that servicing is authorized. The technician may then proceed with the challenge response.

Figure 11:
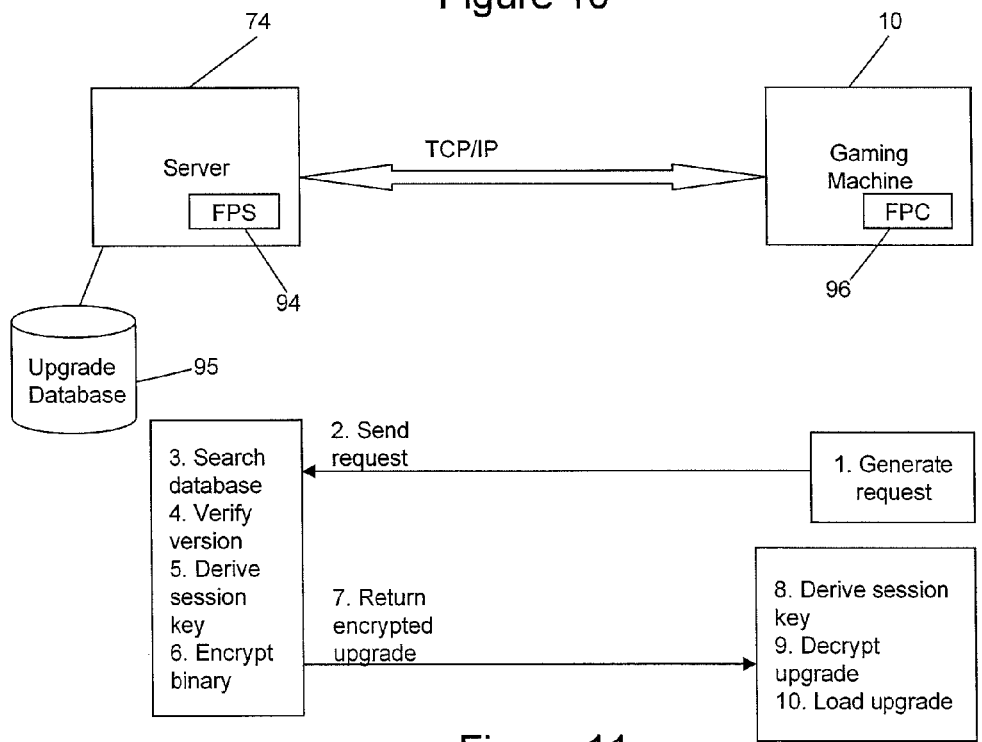
FIG. 11 is a flow diagram illustrating a secure software upgrade process.
Figure 12:
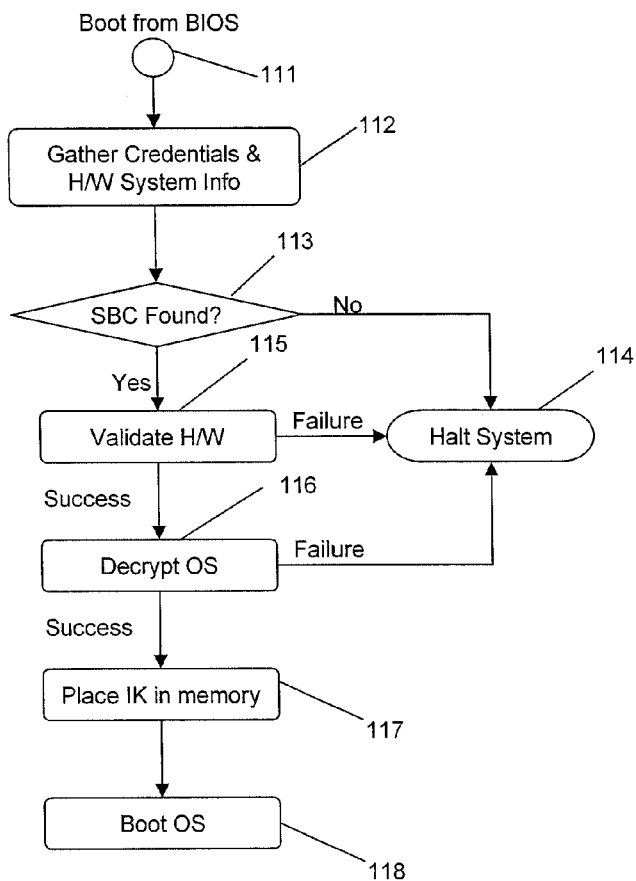
FIG. 12 is a flow diagram illustrating a secure boot authentication process.

The H/W board 12 may at some point require a secure software upgrade. Software upgrade security can be accomplished using a file-point system. Referring to FIG. 11, a file-point client (FPC) 96 located on the product (e.g. gaming machine 10) uses existing application binaries to generate a cryptographic request at step 1 to send to a file-point server (FPS) 94 located at the server 74 at step 2. As such, the machine 10 can request software upgrades (e.g. at periodic intervals of time) without the need for a technician as shown in FIG. 11. The FPS 94 searches through a database 95 of all previous versions of the application binaries at step 3 and verifies which version of the application the technician is upgrading and whether the technician is authorized to perform the upgrade at step 4. The FPS 94 derives a session encryption key at step 5 and encrypts the upgrade binary at step 6, then returns the encrypted upgrade to the FPC at step 7. The FPC 96 also derives the session key at step 8 in order to decrypt the upgrade at step 9. The algorithm used to perform these steps is designed to ensure that only the requesting FPC with a valid application binary is able to derive this key to load the upgrade at step 10.

In a specific example, the file point system uses a proprietary key establishment algorithm to ensure that application binaries are protected in transit. When the FPC 96 requests an upgrade, it uses the data within the object to be upgraded (OU) to generate an ephemeral key (EK). It then creates a request datagram that includes information about the OU, the system ID and the EK. This data is then sent to the FPS 94, which uses the SID to lookup and verify the identity of the FPC 96 (and possibly validate that the system is authorized to perform the upgrade) and to obtain a hash of the system's SBC. It then uses the OU information within the request to look up the version of the OU in its upgrade object database 95. The FPS 94 then generates the EK, calculates an ECPVS signature of EK, using the hash of the secure boot credentials (SBCH) as validation, and returns it to the FPC 96 as a response datagram.

The FPS 94 then derives a session key (SK) from the two EKs and uses this SK to encrypt the upgrade object (UO). The FPS 94 then sends the encrypted UO to the FPC 96. When the FPC 96 receives the response datagram, it calculates the hash of its SBC IS and verifies the ECPVS signature using, the ECPUK and the SUCH, which authenticates FPS 94, which recovers FPS's EK. The FPC 96 then derives the SK from the two EKs and uses it to decrypt the UO.

The signature generation can be performed using ECPVS as follows:

$ECPVS_{ECPRK}(SBCH,EK) \Rightarrow RESP$; and the response is verified using ECPVS as follows:

$ECPVS_{ECPUK}(SBCH,RESP) \Rightarrow EK$.

In one example, the API 56 includes a single function call FPC_getUpgrade(sid, appID, curVerID, appFilename, fpsIPAddr, timeout), where sid is the system identifier, appID is the application identifier, curVerID is the current version identifier of the application, appFilename is the filename of the application binary, fpsIPAddr is the IP address of the FPS 94, and timeout is the length of time to wait for a response from the server 74. This function first constructs the cryptographic request datagram and then connects to the FPS 94 to deliver the request. The function then waits for the designated timeout period for a response. When the response is received, the function validates the response datagram, then decrypts and stores the new application binary as described above.

In the same example, the server API (not shown) includes a single function call FPS_waitUpgradeRequest(dbAddr, portNo), where dbAddr is an address identifier to contact the upgrade database 95. The server 74 waits for a request on the port identifier by portNo for incoming socket connection requests from any FPC 96. When a request is received, the function contacts the database 95 to obtain the necessary information to generate the response datagram and to encrypt the binary image to be upgraded. The FPS 94 then sends the response datagram and encrypted image back to the calling FPC 96. Once this is complete, the FPS 94 generates a log of the communication.

Due to the open and relatively insecure characteristics of the standard platform, the security of the system described above is maintained through the separation of the cryptographic identity between the BIOS 14 and HDD 20. The following describes possible attacks to the system and the effective security enforced by the system to thwart such attacks.

One attack includes where the attacker attempts to flash their own BIOS to the H/W board 12 in an attempt to circumvent the secure boot process. This attack is prevented because the re-flashing, will destroy the SBC necessary in the secure boot process. An attacker will not be able to decrypt the image key (SUC), and thus will not be able to decrypt the image 24.

Another attack involves an attacker removing the HDD and attempting to recover the encrypted image via brute-force cryptoanalysis (e.g., known-plaintext, chosen-plaintext, adaptive chosen-plaintext, adaptive chosen ciphertext, related key etc). This attack becomes infeasible because a strong standards based encryption algorithm (e.g. AES) with appropriate cipher-strength can be used in the system to thwart such an attack. For example, using a distributed computing network, the brute force attack on an 80-bit AES key can take years—approximately one decade and adding bits to the key length increases this time exponentially. In the gaming environment this type of attack is clearly infeasible for an attacker to pursue.

It is therefore seen that by binding hardware-specific data to credentials stored in the BIOS and using ECPVS signature generation and verification, an implicit verification of an image 24a can be performed. Moreover, the use of a IS 70 enables the distribution and metering of keying data (e.g. SSVs) in conjunction with a specialized HBM. Binding the H/W board 12 during manufacturing using a KIS 70 inhibits grey or black market activity and ensures that the content being loaded onto the machine 10 is not compromised by a third party contractor. Similarly, the use of an HBM during repairs protects the image 24a from being tampered with by a technician.

In yet another embodiment, shown in FIGS. 13-17, a gaming device 400 used in gaining machine 10, is authenticated using a one time programmable (OTP) read only memory (ROM) BIOS 402. The BIOS 402 is trusted because by nature it cannot be modified (i.e. "read only"), and is used in this embodiment instead of a flash BIOS, which by nature can be modified.

Figure 13:
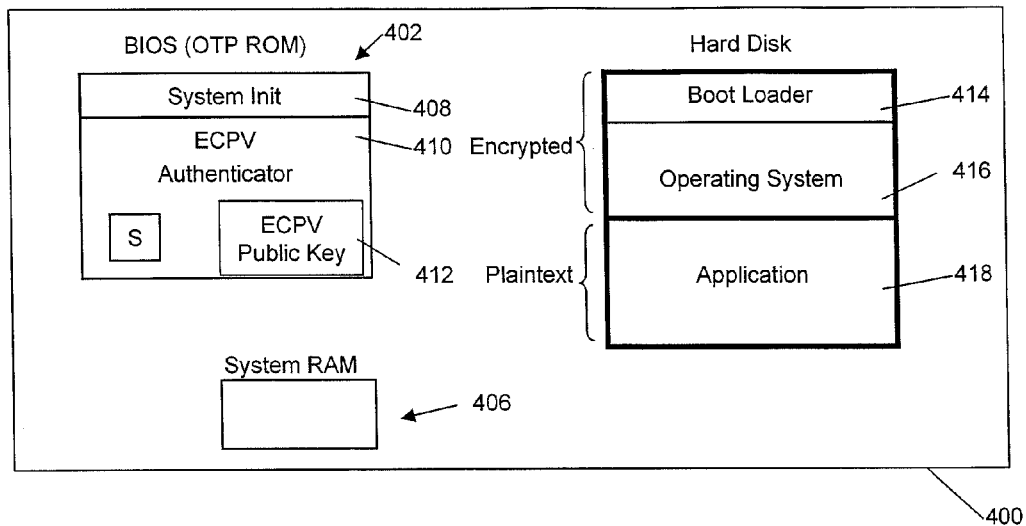
FIG. 13 is a schematic block diagram of a system layout for an authenticated gaming device.

Referring first to FIG. 13, the gaming device 400 generally comprises the OTP ROM BIOS 402, a hard disk, and system random access memory (RAM) 406. The BIOS 402 stores a system initialization module 408, which is loaded into RAM 406 during a boot operation; and an ECPV authenticator module 410, which is used to perform an ECPV verification or authentication of the contents of the hard disk 404. The ECPV authenticator module 410 stores an ECPV public key 412 and an ECPV signature components, which are used during ECPV verification.

The hard disk 404 comprises a boot loader 414, which sets up an operating system 416, which in turn loads and executes an application 418. In this example, the application 418 is gaming data that is run, displayed, and played by a user on the gaming machine 10. As shown in FIG. 13, in this embodiment, the boot loader 414 and operating system (O/S) 416 are encrypted on the hard disk 404, and the application 418 is plaintext or "in the clear" or otherwise decrypted or not encrypted.

The ECPV authentication module 410 is executed at the boot up operation to simultaneously validate the application 418 and the O/S 416 prior to execution of the application The verification is performed according to the principles of ECPV signature verification.

Figure 14:
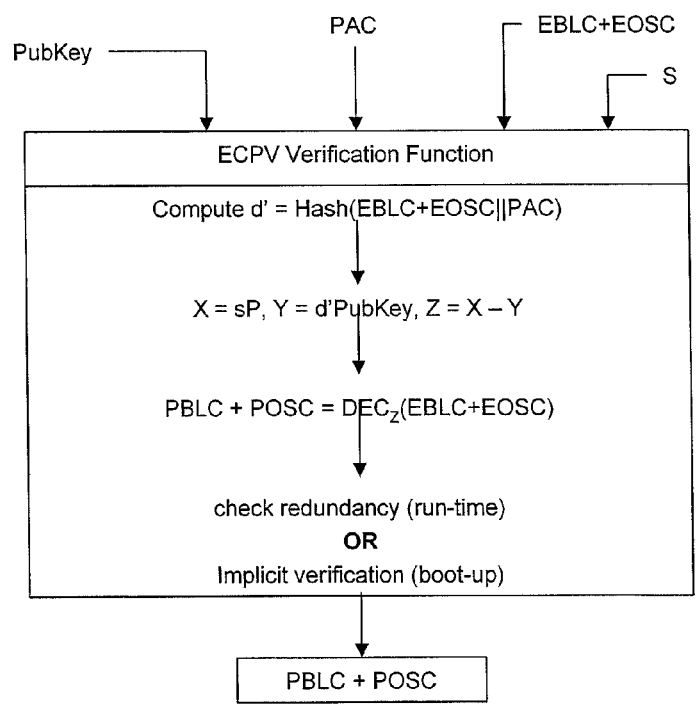
FIG. 14 is a flow diagram illustrating verification of the hard disk of FIG. 13 using the Elliptic Curve Pinstov-Vanstone Signature Scheme.

Referring now to FIG. 14, the following acronyms are used:

PubKey=ECPV Public Key 412
PAC=plaintext application code (e.g. application 418)
EBLC=encrypted boot loader code (e.g. boot loader 414)
EOSC=encrypted operating system code (e.g. O/S 416)
PBLC=plaintext boot loader code (e.g. decrypted boot loader 414')
POSC=plaintext operation system code (e.g. decrypted O/S 416')

In this example, the ECPV signature comprises the components (EBLC+EOSC, s, PAC), where PAC is the visible portion, e.g. plaintext application 418, EBLC+EOSC is signature component e, and s is the other ECPV signature component. The signature components, along with the ECPV public key 412, are input into an ECPV verification function 420 by the ECPV authentication module 410. The signature components e and s are computed according to the principles of ECPV, e.g. during a binding or manufacturing process as discussed above, and the necessary components written to the unalterable BIOS 402.

Figure 17:
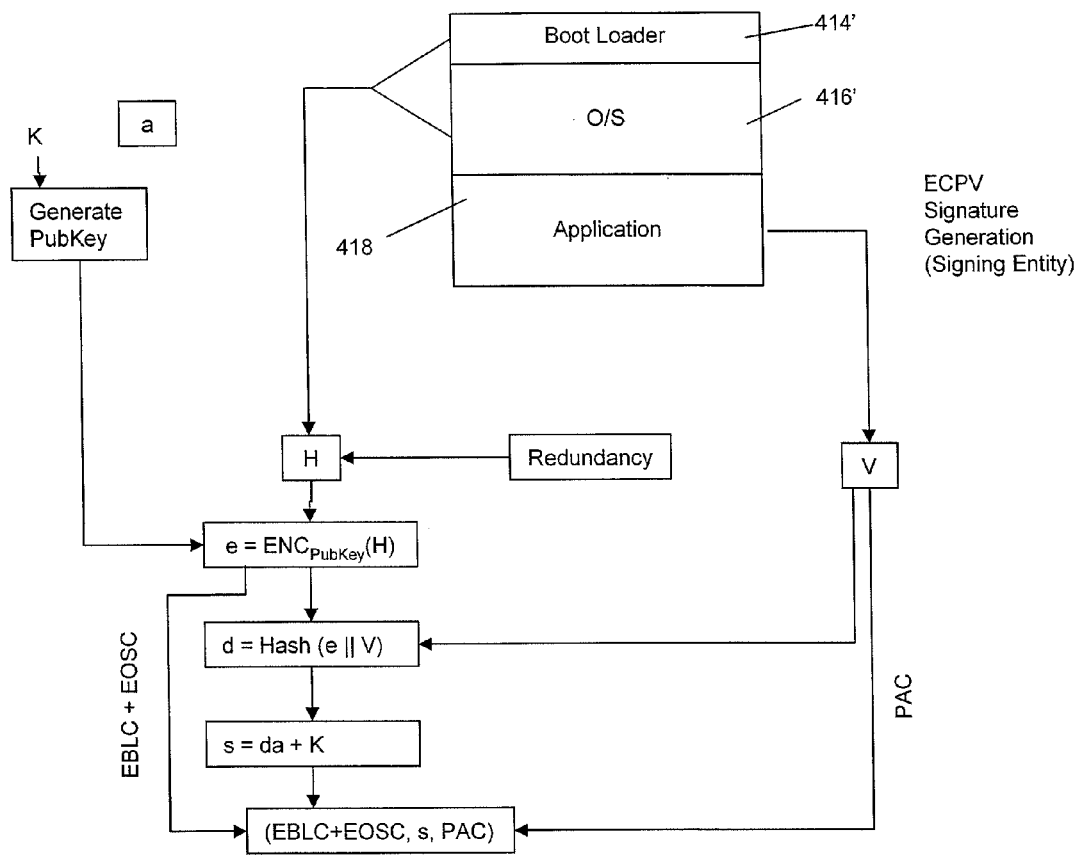
FIG. 17 is a schematic diagram showing Elliptic Curve Pinstov-Vanstone signature generation for the embodiment of FIG. 13.

For example, as shown in FIG. 17, the hard disk 404 in its original, fully unencrypted form, may be split into a visible portion V and a hidden portion H, where the visible portion V comprises the application 418' and the hidden portion H comprises the unencrypted boot loader 414', the unencrypted O/S 416' and a certain amount of redundancy that is added if necessary. In this case, the redundancy is added to the unencrypted boot loader 414' and/or the O/S 416', which constitute the hidden portion H. The amount of redundancy should be stored by a gaming authority for later payout verifications during run time, as will be explained in greater detail below.

The hidden portion H is encrypted using PubKey to generate the signature component e, which is equivalent to EBLC+EOSC. PubKey is generated from a random number k computed by the signing entity (not shown). The signing entity also has a signing private key a as shown in FIG. 17. Component e is concatenated with the visible portion V (equivalent to PAC), and hashed to create an intermediate component d. The signature component s is then computed using the intermediate component 4, the private key a, and the random number k. The signature component s may be written to the authenticator module 410 along with the ECPV public key 412, or may be stored in a suitable location on the hard disk 404. The resultant signature is (e, s, V) or equivalently (EBLC+EOSC, s, PAC) in this example.

Turning back to FIG. 14, the ECPV verification function 420 computes a representation d' of intermediate component d by combining signature component e (e.g. EBLC+EOSC) with visible portion V (e.g. PAC), e.g. via concatenation. A decryption key Z is then derived by first computing X=sP, where P is a point on an elliptic curve; then computing Y=e·PubKey; and finally subtracting Y from X. The decryption key Z is then used to decrypt PBLC+POSC from EBLC+EOSC.

During a boot up sequence, the system initialization module 408 is first loaded into system RAM 406 and executed. The system initialization module 408 executes a power on self test (POST) but since the BIOS 402 is unalterable, does not need to perform a self integrity check. The system initialization module 408 then loads and executes the ECPV authenticator module 410. The authenticator module 410 then accesses the ECPV public key 412 and signature component s stored therein, obtains copies of the encrypted boot loader 414 and encrypted OS 416 (EBLC+EOSC), and the plaintext application 418, which are temporarily stored in system RAM 406, and inputs them into the ECPV verification function 400. As described above and shown in FIG. 17, the ECPV verification process recovers the plaintext boot loader 414' (PBLC) and plaintext OS 416' (POSC). The PBLC and POSC are then loaded into system RAM 406, and execution is passed to the PBLC. The PBLC then executes POSC, which in turn loads and executes the application 418 already loaded in the system RAM 406 during ECPV verification.

Since the PAC is used in the ECPV verification, if the application 418 has been tampered with, e.g. code added etc., the application 418 will not run properly, since an incorrect boot loader 414' and/or OS 416' will be recovered. Therefore, authentication at boot up is implicit.

When verifying code at run-time, e.g. to verify a win output from the gaming device 400, the application code 418, and EBLC and EOSC (already stored in system RAM 406 from the boot up sequence), are used to perform another ECPV verification. To verify the will, a gaming authority may be called to the machine 400, and a peripheral device (not shown) plugged in, e.g. via a USB connection (not shown). The peripheral device should be trusted by virtue of it being under the supervision of the gaming authority. The application code 418, EBLC and EOSC, PubKey, and signature component s are input into an ECPV verification function 420 stored on the peripheral device and the plaintext PBLC+POSC recovered, which is the hidden portion H. As discussed above, H has or is given a particular amount of redundancy, e.g. a predetermined number of zeros. The peripheral device, may then check the redundancy of H and if it matches the expected redundancy, then the application code 418 has not been tampered with and is verified.

For the purposes of verifying a win output from the gaming machine 10, the cash or credit may then be paid out by the gaming authority if the run-time code is verified. The run-time verification enables the gaming authority to ensure that the application code (PAC) that signalled the win, wasn't tampered with between the boot up sequence and the win. The boot up sequence is used primarily to verify that the gaming machine has not been tampered with while powered down. Since the boot up verification is implicit, any tampering will result in bad code that will not run properly.

Figure 15:
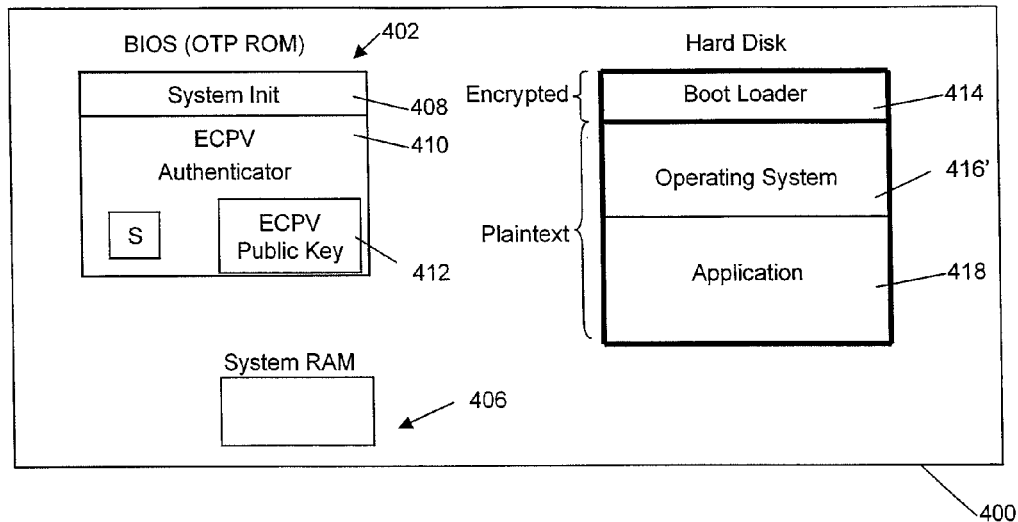
FIG. 15 is a schematic block diagram of another system layout for an authenticated gaming device.
Figure 16:
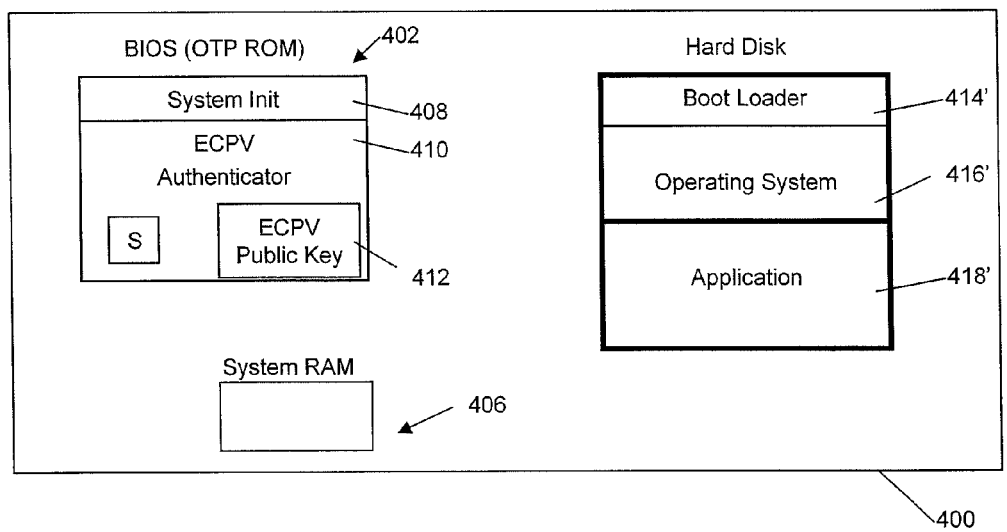
FIG. 16 is a schematic block diagram of yet another system layout for an authenticated gaming device.

Referring now to FIGS. 15 and 16, alternative system layouts may be used.

In the first alternative shown in FIG. 15, only the boot loader 414 is encrypted, and the OS 416' and application 418 are in plaintext. For this embodiment, the hidden portion H is PBLC, the visible portion is PAC+POSC, and the ECPV signature is (EBLC, s, PAC+POSC) computed using the above-described principles while inputting the alternative values for H and V. ECPV verification would therefore check the redundancy of the boot loader 414' when verifying at run time and implicitly verify at boot up as before. The embodiment shown in FIG. 15 simplifies decryption and memory requirements since the boot loader 414 is a smaller piece of software than the OS 416'.

Turning now to FIG. 16, where the application 418 is relatively small (according to available memory), the application 418 may be encrypted and an encrypted application 418' stored on the hard disk 404. The plaintext version of the application 418 is in this embodiment the hidden portion H, where the signature component e is now the encrypted application EAC. The visible portion would then be the plaintext boot loader PBLC and the plaintext OS POSC, and the ECPV signature would be (EAC, s, PBLC+POSC). ECPV verification therefore either checks the redundancy of the plaintext application 418 when verifying at run time and implicitly verifies at boot up as before. By encrypting the application code 418, some protection against theft of the application code 418' may be given, provided that the ECPV public key 412 is protected. If an adversary was able to steal the hard disk 404, unless they have knowledge of the ECPV public key 412, they would not be able to recover the plaintext application code 418.

It may therefore be seen that the embodiments shown in FIGS. 13 to 17 enable both the OS 416 and application code 418 to be verified simultaneously using ECPV signature verification. The unalterable OTP ROM BIOS 402 can be trusted as it cannot be modified and thus the BIOS 402 does not need to be verified on boot up and can proceed directly to authenticating the OS 416 and application 418. ECPV signature verification can be used to verify both the boot up sequence and at run time, e.g. to verify a win. Such verifications may be used to satisfy a gaming authority that the application code 418 has not been tampered with when the gaming machine 400 is powered down, and during execution thereof.

Yet another embodiment for authenticating a gaming machine 500 is shown in FIGS. 18-27. Similar to the embodiments above, the gaming machine 500 includes a display 502 and input mechanism 504 to enable a player to interact with the gaming machine 500 and play one or more games loaded thereon. The gaming machine 500 also includes a protected hardware board (H/W) 506. In this embodiment, the hardware board 506 is connected to a network 510 over a data connection 508 to enable the gaming machine 500 to download (or have uploaded to) new game files 512. It will be appreciated that the network 510 may be an internal or local network or may be an external network such as the Internet, depending on the location of the gaming machine 500. For example, if the gaming machine 500 is in a casino, there may be several machines connected to the same local network 510, which may have a server (not shown) to control distribution of game content and monitoring of the gaming machines etc. In another example, the gaming machine 500 may be a stand alone unit in a public location wherein the gaming machine 500 connects to an external entity or server (not shown) over a network connection.

Figure 18:
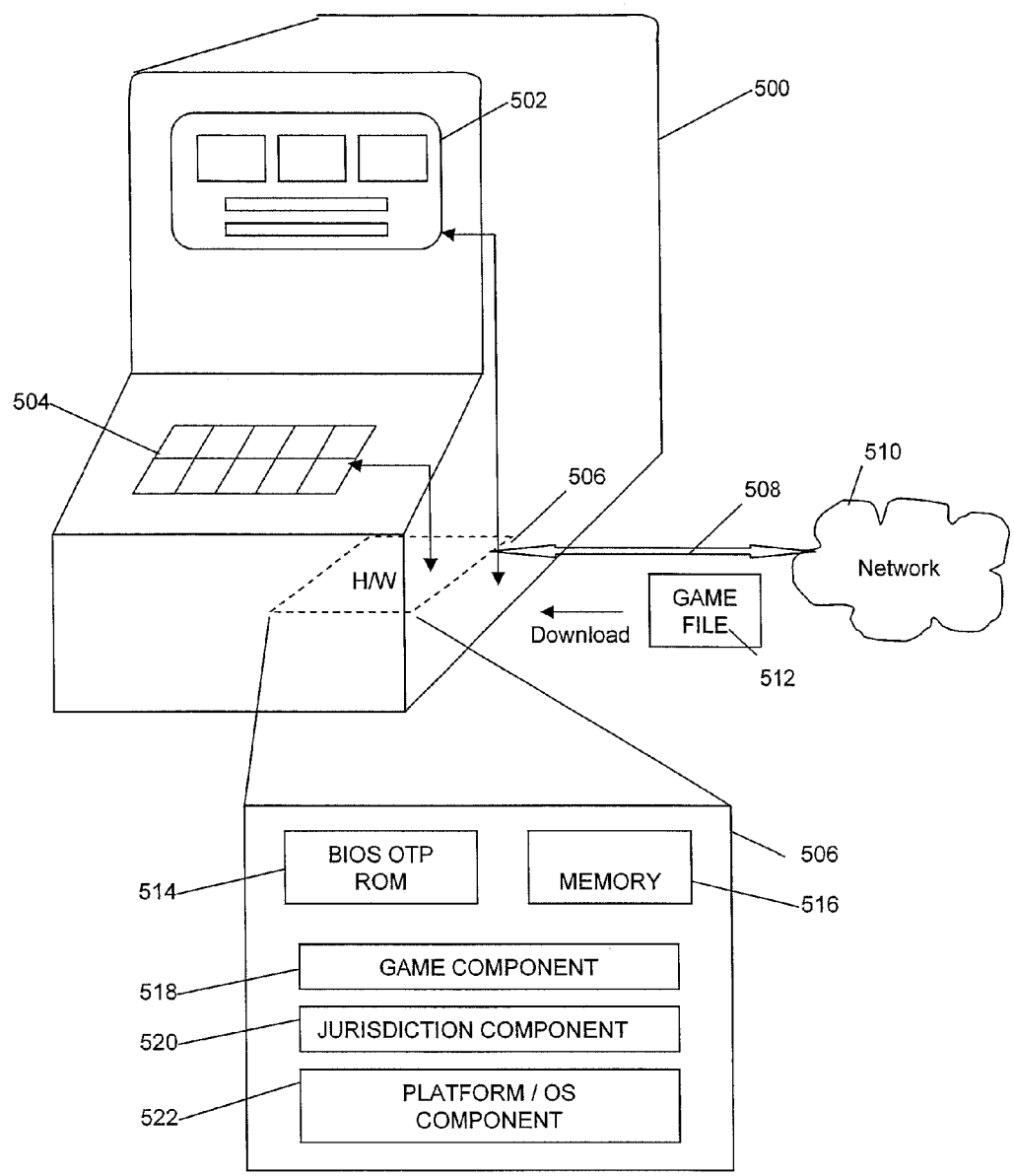
FIG. 18 is a schematic diagram of a gaming machine having a protected hardware board and a network connection for downloading a game file.

The hardware board 506 shown in FIG. 18, has a BIOS OTP ROM 514, a memory 516 for storing data during operation of the machine 500 and/or for persistent storage as needed, a game component 518 for running game files 512, a jurisdiction component 520 for storing jurisdiction related data such as gaming regulations, payout odds etc., and a platform or OS component 522 (i.e. portions of the content used by the gaming machine 500).

Figure 19:
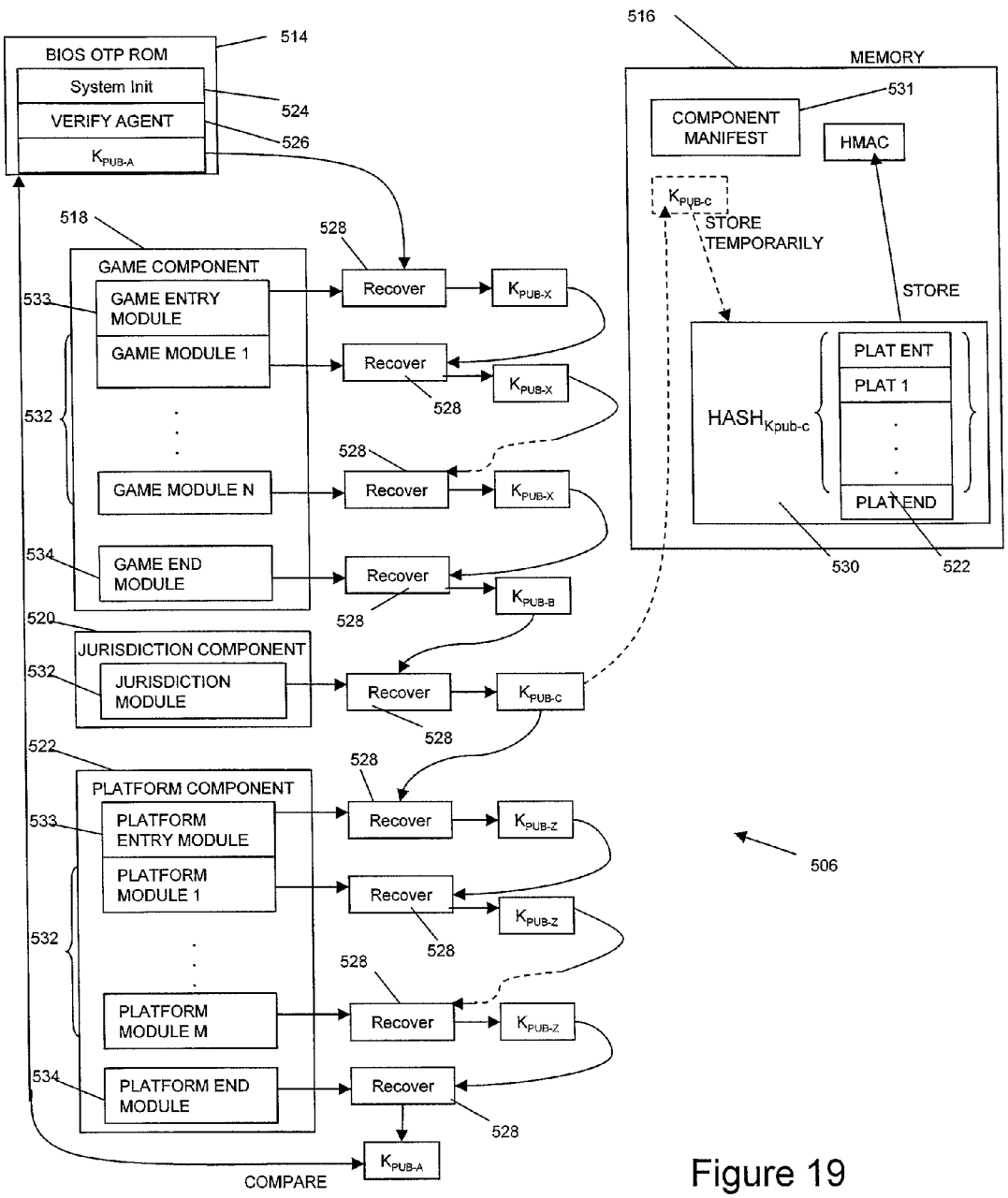
FIG. 19 is a schematic diagram of the hardware board of FIG. 18 showing a chained signature verification procedure.

Turning now to FIG. 19, the components of the hardware board 506 are shown in greater detail. The ROM 514 includes a system initialization module 524 (similar to that described above), a verification agent 526 for booting up the gaming machine 500, and an input value to be used to begin a chained signature verification procedure, in this example, a public key $K_{PUB-A}$. The value $K_{PUB-A}$ is used as an input to the first of the chained key or value recovery steps in such a procedure, the general flow of which is also illustrated in FIG. 19. Each of the game component 518, the jurisdiction component 520 and the platform component 522 includes an entry module 533, one or more other modules 532, and an end module 534. Each module 532, 533 and 534 is a portion of code, a file, a collection of files or other segment of data that, when combined with the other modules 532, 533, 534 in the same component, make up the complete set of data for that component. In this example, the game component 518 includes a Game Entry Module, an arbitrary N number of other game modules 532, which will be hereinafter referred to as Game Module 1, Game Module 2, . . . , Game Module N; and an Game End Module.

The jurisdiction component 520 includes only one module 532 in this example, namely a Jurisdiction Module and thus does not require either an entry module 533 or an end module 534. The platform component 522, similar to the game component 518, includes a Platform Entry Module, an arbitrary number of other platform modules 532, in this example M modules hereinafter referred to as Platform Module 1, Platform Module 2, . . . , Platform Module M; and a Platform End Module.

With the configuration shown in FIG. 19, in both the game module 518 and the platform module 522, the modules 532 may be removed, inserted, replaced, shifted, reordered etc. without reprogramming the signature verification sequence. In this example, as will be explained below, the entry modules 533 are always operated on first as they are signed using the output from the end module 534 of the previous component, or using $K_{PUB-A}$ in the case of the game component 518. The order in which the other modules 532 are operated on to recover the next value needed in the chain, is determined by referencing a component manifest 531 stored in memory 516.

Each module 532, 533, 534 is signed before it is loaded into the respective component on the hardware board 5206, and a value stored in the signature is recovered using a recovery function 528. The recovery function 528 operates on a set of signature components, one set being associated with each module 532, 533, 534, to recover a piece of data encrypted therein. The recovery function 528 is related to a corresponding signature generation function that encrypts or hides a portion of data that is recovered at each sub-step during the chained verification procedure. The recovered data is then used as an input to the next execution of the recovery function 528 performed in the chain. As such, the modules 532, 533, 534 are not authenticated individually at each execution of the function 528, but instead authenticated implicitly and at the same time by comparing a final output recovered from the signature on the end module 534 of the last component, with the original input to the chain. In this way, the entire contents of the hardware board 506 can be authenticated at the same time. Preferably, the recovery function 528 is related to signature generation and verification functions, preferably an ECPVS scheme, the details of which are explained above. As illustrated in FIG. 19, execution of the recovery function 528 for each module 532 in the same component recovers the same value or key, which enables these game modules or platform modules (i.e. those that aren't the entry or end modules) to be removed, replaced, added etc. without having to reconfigure the entire system.

When a new module is added, the chain is lengthened in that another verification step is required at boot up, however, since the output is the same as the other modules 532, the respective inputs and outputs required to be passed between such components would not be affected. If the component manifest 531 is relied upon for determining the order in which modules are to be verified, then it should be updated as new games are added.

Figure 20:
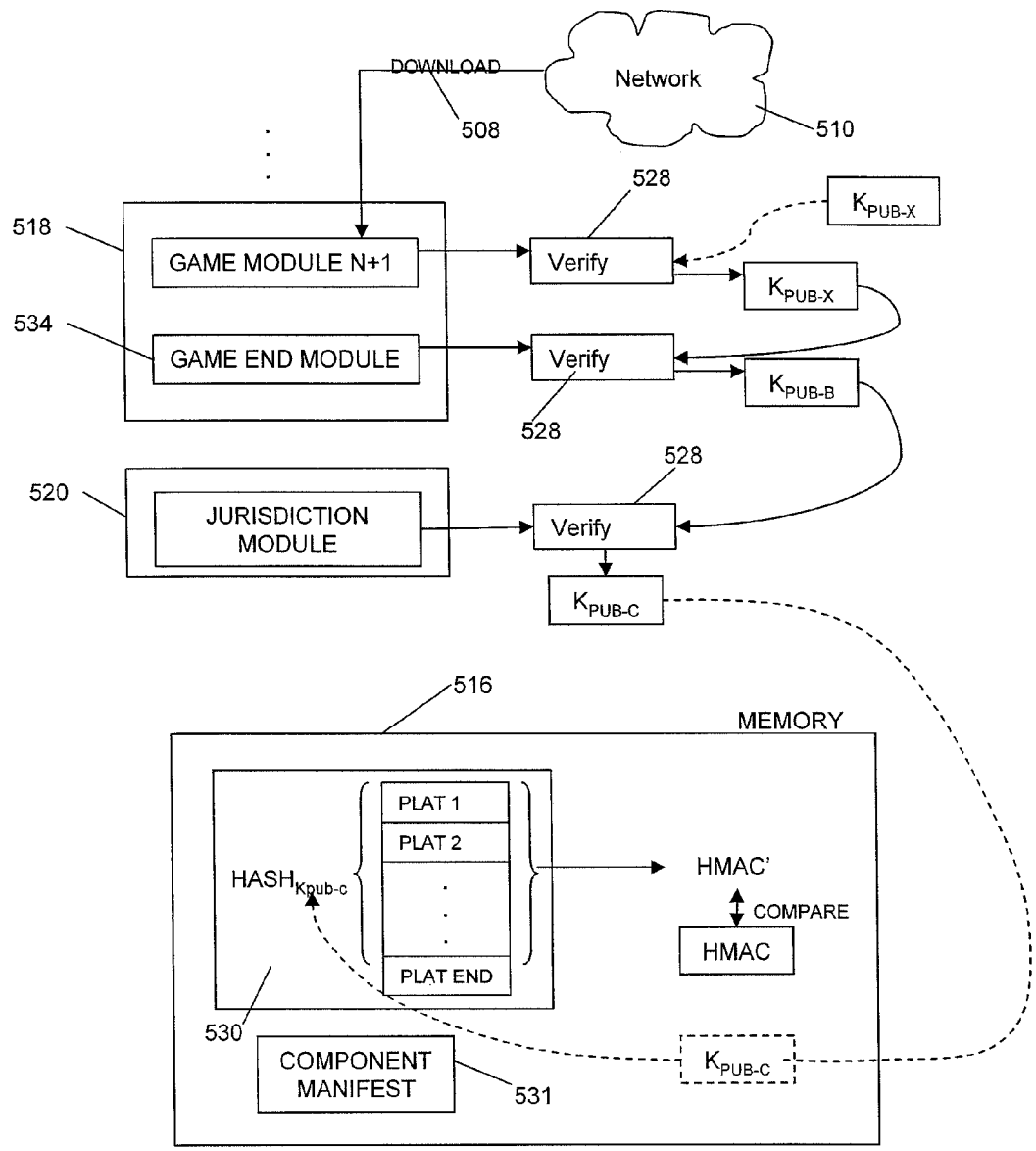
FIG. 20 is a schematic diagram of the hardware board of FIG. 19 showing a verification procedure when downloading a new game file.
Figure 21:
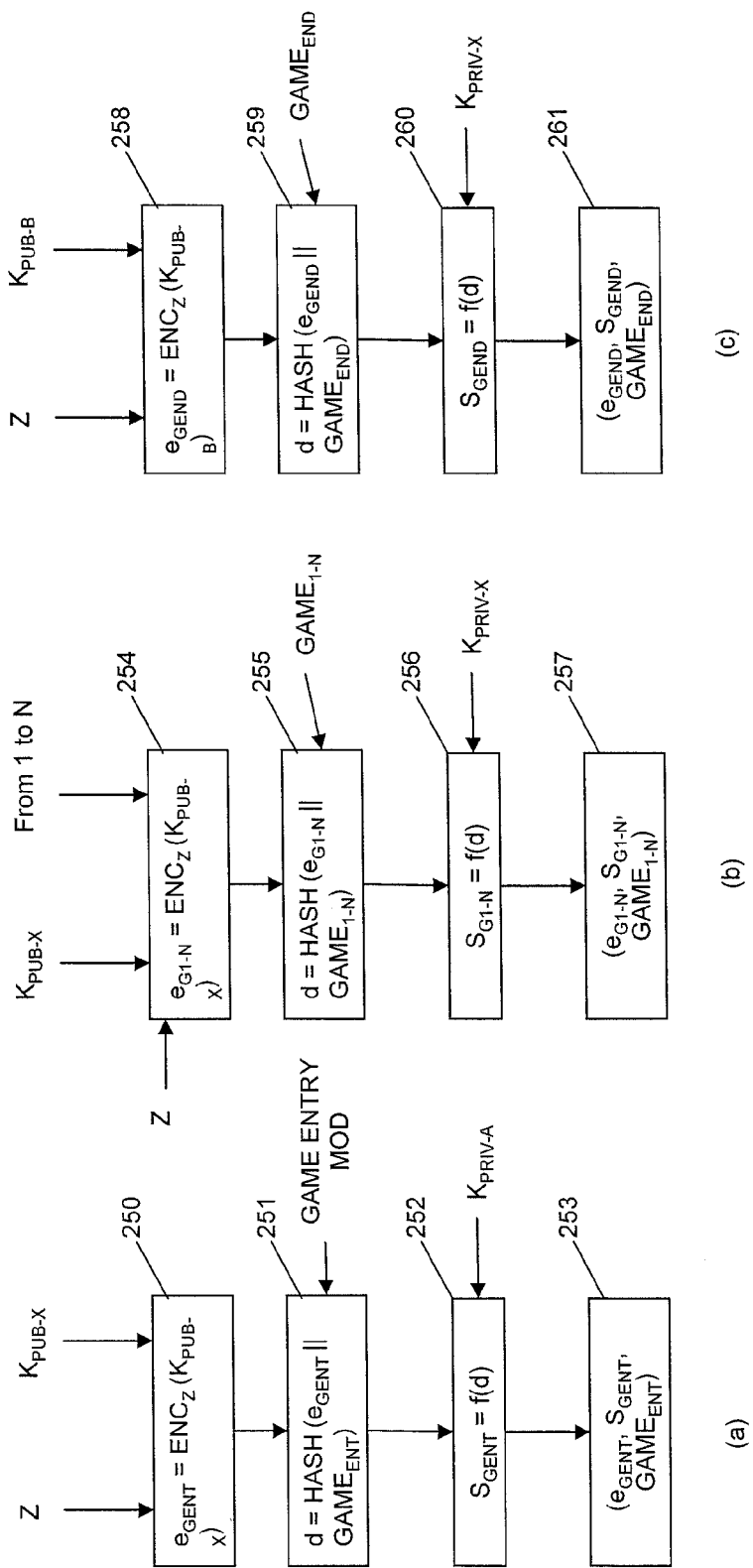
FIGS. 21(a)-21(c) are flow diagrams illustrating signature generation for the game component modules of FIG. 19.

FIG. 20 illustrates where a new game file 512 is downloaded from the network 510. A new game module corresponding to the new game file 512, named Game Module N+1, is added to the end of the set of modules 532 in the game component 518. The chained structure shown in FIG. 19 enables the new game module to be verified as it is downloaded without having to re-boot the entire gaming machine 500. By enabling new game modules to be added without re-booting the system, a significant amount of time can be saved and such new names can be added while the gaming machine 500 is in operation.

The memory 516 also stores an authentication code, e.g. an HMAC, which comprises a keyed-hash of the contents of the platform or OS component 522 generated using a keyed hash function 531. In this example, the key used to generate the HMAC is generated using an intermediate value ($K_{PUB-C}$) that is recovered during the chained verification sequence at boot Lip.

As noted above, each module 532, 533, 534 is signed, preferably using an ECPVS scheme, such that the recoverable or hidden portion H from each module is used as an input (e.g. the public key) for the next execution of the recovery function 528 in the chain. The values used to sign the modules 532, 533, 534 are private keys, which have corresponding public keys. Although considered 'public', the public keys used herein should not be stored on the gaming machine 500 except for the value $K_{PUB-A}$ (stored in ROM and needed to start the chain) since these keys can be used to recover inputs needed for authenticating the gaming machine 500. The corresponding private keys can be generated and stored securely at an appropriate authority such as the gaming machine 500 manufacturer and/or a gaming authority (regulator, casino management etc.). In this way, a trusted patty is responsible for signing the came modules and platform modules prior to installing the gaming machine 500 and responsible for signing new game modules. In the example described herein, five key pairs are used, namely $K_{PUB-A}/K_{PRIV-A}$, $K_{PUB-X}/K_{PRIV-X}$, $K_{PUB-B}/K_{PRIV-B}$, $K_{PUB-C}/K_{PRIV-C}$, and $K_{PUB-Z}/K_{PRIV-Z}$. It will be appreciated that greater or fewer key pairs may exist if there are greater or fewer modules/components in the gaming machine 500. Since the key pair $K_{PUB-C}/K_{PRIV-C}$ is used to sign the Jurisdiction Module, which contains gaming regulations and the like, that key pair should be held by and/or generated by the gaming authority and be unique to the Jurisdiction Module. As will be explained below, this also enables the gaming authority to retain a copy of the HMAC for conducting its own authentication of the platform module 522, e.g. during a payout.

FIGS. 21(a) to (c) illustrate signature generation steps used to sign the game component modules using ECPVS. In diagram (a), the Game Entry Module is signed using $K_{PRIV-A}$ and the hidden or recoverable portion, i.e. the value to be encrypted in the signature, is $K_{PUB-X}$. A first signature component $e_{GENT}$ is generated by encrypting $K_{PUB-X}$ using a key Z, which is derived from a randomly generated, ephemeral public/private key pair at step 250. At step 251, the intermediate component d is computed by hashing a combination (e.g., concatenation) of the component $e_{GENT}$ and the contents of the Game Entry Module. A second signature component $s_{GENT}$ is then generated at step 252, as a function of intermediate component d using the private key $K_{PRIV-A}$ and the ephemeral private key. Similar to the other embodiments above, the component 's' in ECPVS can be generated, e.g., using the Schnorr signature algorithm. The resultant signature provided at step 253 is comprised of the components $e_{GENT}$ and $s_{GENT}$ and the Game Entry Module, which can be obtained directly from the game component 518 at the time of executing the verification function on for the corresponding module.

In FIG. 21(b) a generic procedure for signing the other game modules, i.e. from 1 to N is shown. It can be seen that each of the remaining modules 532 (from 1 to N) is signed using the same inputs Z and $K_{PRIV-X}$, and each will encrypt or hide the same value. In this way, the other modules 532 can be verified in any order, since they each require the same input and produce the same output (when the modules are authentic) for use in the next execution of the signature recovery function 528 in the chain. In step 254, $K_{PUB-X}$ is encrypted using a key Z, derived from a randomly generated ephemeral key pair, as an input in generating the first signature component $e_{G1toN}$, which is then concatenated with the respective game module Game Module 1 to N and hashed at step 255 to generate the intermediate component d. The second signature component is then generated as a function of d using the private key $K_{PRIV-X}$ and the ephemeral private key in step 256 and the resultant signature is obtained at step 257.

In FIG. 21(c), a procedure for signing the Game End Module is shown in steps 258 to 261. It can be seen that the signature is generated in a similar fashion to that shown in FIGS. 21(a) and (b), however, a value Z is used in this case to encrypt another value, $K_{PUB-B}$, which is to be used in the verification of the jurisdiction component 520. As such, the details of steps 258 to 261 need not be explained further.

Figure 22:
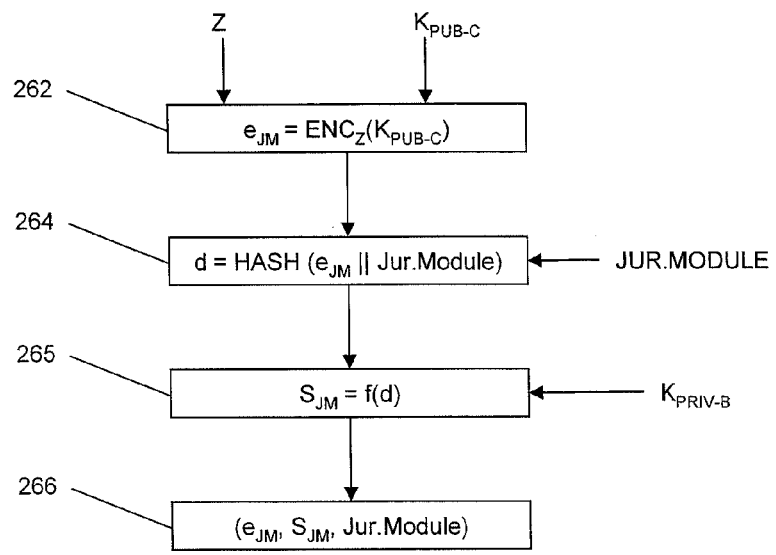
FIG. 22 is a flow diagram illustrating signature generation for the jurisdiction module of FIG. 19.

Turning now to FIG. 22, a procedure for signing the Jurisdiction Module is shown. The Jurisdiction Module uses the value $K_{PUB-B}$ as an input during verification, and this value is recovered from the signature on the Game End Module. The signature for the Jurisdiction Module is created, in part, by encrypting another value $K_{PUB-C}$ with a key Z at step 262, to generate the first signature component $e_{JM}$, and using the private key $K_{PRIV-B}$ to generate the second signature component $s_{JM}$. The value $K_{PUB-C}$ may then be recovered from the signature on the Jurisdiction Module. The value $K_{PUB-C}$, once recovered, is then used as the input to the chain of recovery functions 528 executed on the signatures on the platform component modules. At step 263, the intermediate component d is generated by hashing a concatenation of the first signature component $e_{JM}$ and the Jurisdiction Module, and at step 264, the second signature component $s_{JM}$ is generated as a function of the intermediate component d (and using the key $K_{PRIV-B}$). The resultant signature provided at step 265 is the first and second signature components $e_{JM}$ and $s_{JM}$, and the Jurisdiction Module.

Figure 23:
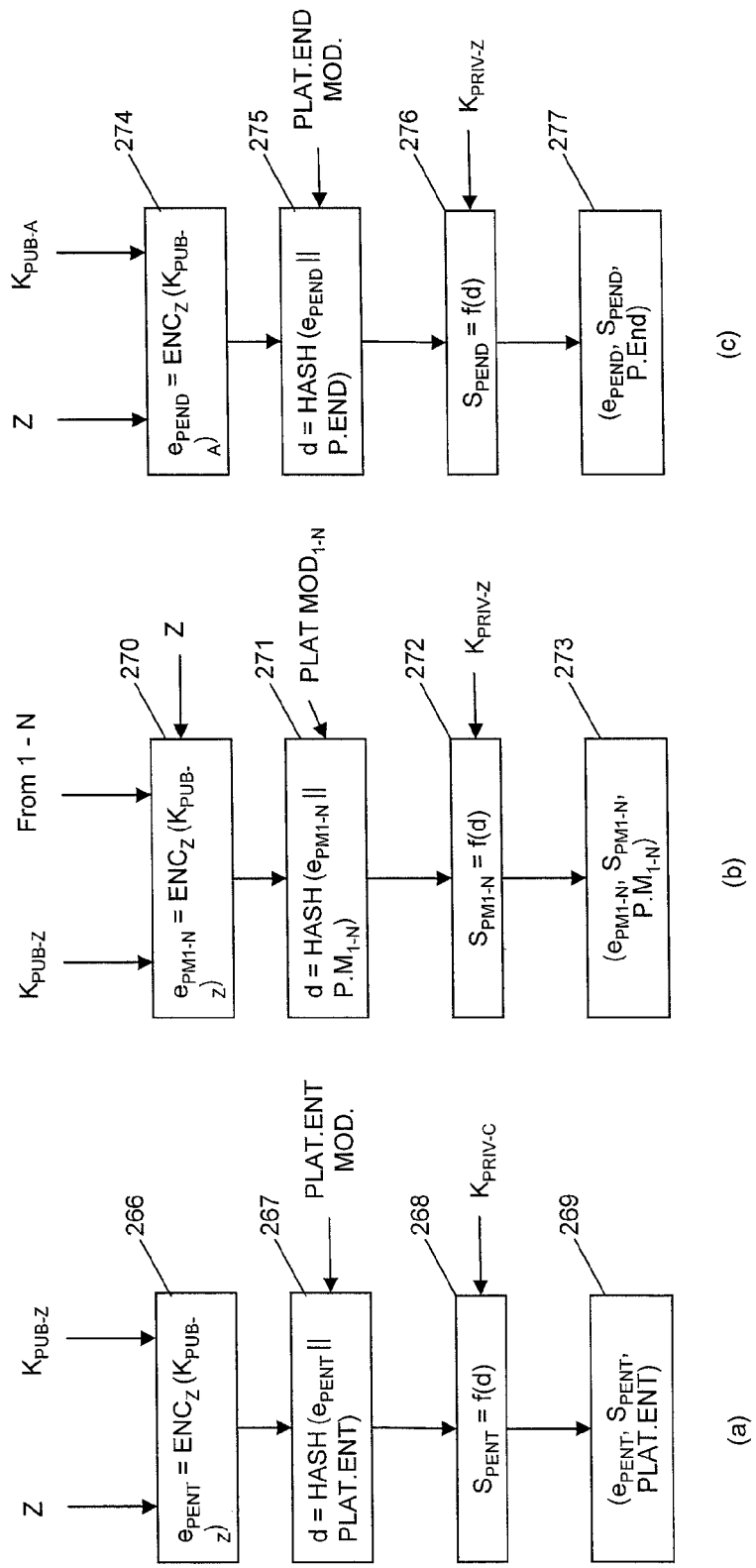
FIGS. 23(a)-23(c) are flow diagrams illustrating signature generation for the platform component modules of FIG. 19.

Turning now to FIGS. 23(a) to (c), flow diagrams are shown for signing the modules 532, 533, 534 of the platform component 522. It may be noted that modules 532, 533, 534 of the platform component 522 are signed in the same way as the corresponding modules 532, 533, 534 of the gaming component 518 with the Platform Entry Module using the value $K_{PUB-C}$ as an input. Each application of the recovery function 528 on Platform Modules 1 to M recovers the same value $K_{PUB-Z}$, which is ultimately used as an input for recovering $K_{PUB-A}$ from the signature on the Platform End Module as can also be seen in FIG. 19. For the platform component 522: $K_{PUB-Z}$ is encrypted using an ephemeral Z and $K_{PRIV-C}$ is used to generate the signature on the Platform Entry Module; $K_{PUB-Z}$ is encrypted using an ephemeral key Z and $K_{PRIV-Z}$ is used to generate the signatures on the subsequent modules; and $K_{PUB-A}$ is encrypted using an ephemeral key Z and $K_{PRIV-Z}$ is used to generate the signature on the Platform End Module. Steps 266-269 in FIG. 23(a) illustrate a procedure for signing the Platform-Entry Module, steps 270-273 in FIG. 23(b) illustrate a procedure for signing Platform Modules 1-M, and steps 274-277 in FIG. 23(c) illustrate a procedure for signing the Platform End Module. It can be seen in FIG. 23 that the signatures on the platform modules are generated in a similar fashion to those generated on the game modules, and thus further detail need not be provided.

Referring, now to FIGS. 24-26 and FIG. 19 described above, a procedure for executing the chained signature verification during a boot-up sequence of the gaming machine 500 will now be discussed.

Prior to execution of the chained signature verification procedure, and once the gaming machine 500 has been booted or powered up etc., during the boot sequence, the verification agent 526 is initiated, reads or otherwise obtains a copy of the value $K_{PUB-A}$ burned on the ROM 514, and accesses the component manifest 531, to determine the order in which the other gaming modules 532 are to be operated on. As noted above, the Game Entry Module is operated on first, and thus the verification agent 526 then obtains the signature components $e_{GENT}$ and SCENT and the data for the Game Entry Module (i.e. the 'signature' for Game Entry Module) at step 278 (see FIG. 24).

According to the steps in ECPVS signature verification, at step 279, an intermediate component d' is generated in the same way as done during signature generation, i.e. using the first signature component $e_{GENT}$ and the Game Entry Module (e.g. by concatenating the two pieces of data and hashing the result). At step 280, a decryption key Z is obtained using the second signature component $s_{GENT}$, the intermediate component d', and the value $K_{PUB-A}$. The decryption key Z is then used in step 281 to decrypt or 'recover' the value $K_{PUB-X}$ from the first signature component $e_{GENT}$. The recovered value $K_{PUB-X}$ is then output at step 282 so that it may serve as an input to the first execution of the recovery function 528 performed on the remaining Game Modules 1 to N and ultimately the Game End Module. Steps 283 to 287 are repeated for each remaining Game Module 1 to N (i.e. until i=N in step 288) wherein a copy of the value $K_{PUB-X}$ that is recovered at each instance of step 286 is fed into the next operation of the function 528. At the end of the chaining sequence for the remaining modules 532, the version of $K_{PUB-X}$ recovered from the signature on Game Module N is then used to recover the next key hidden in the signature on the Game End Module in steps 289 to 293. $K_{PUB-X}$ is used to recover the value $K_{PUB-B}$ at step 292, which is then output at step 293 for use as an input to recover another value from the signature on the Jurisdiction Module as shown in FIG. 25.

It can be appreciated that since ECPVS enables one to control what is encrypted or 'hidden' in the signature, an ECPVS can be used to recover a predictable output, which then can be used as a predictable input to the next step in the chain. In other words, the hidden portion H of the message is the output required to be input to the next module. Therefore, the signature can be performed using the game code as the visible portion and the required input for the next stage as the hidden portion. The recovery steps during verification of the signature using the game code and the input will recover the hidden value provided the code and/or input has not been compromised. Each execution of the recovery function 528 produces an un-authenticated input to the next stage, however, if any of the modules are compromised, the result at the end of the chain will not provide the correct output that permits authentication of the entire content. In this way, the proper output must be recovered in each execution of the recovery function 528 to ensure that an incorrect value does not propagate through the chain. This enables the gaming machine 500 to authenticate the entire content of the hardware board 506 implicitly using the result recovered in the final application of the recovery function 528.

Figure 25:
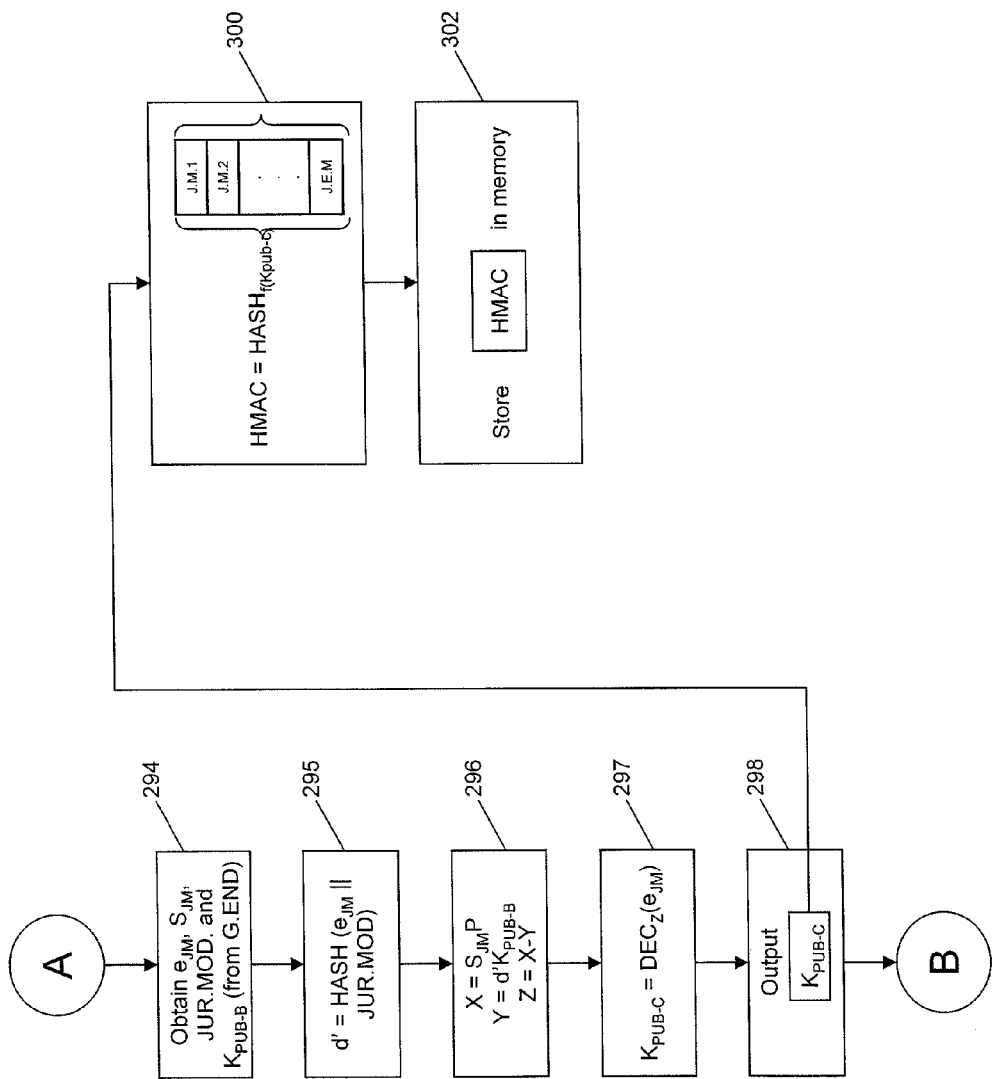
FIG. 25 is a flow diagram illustrating signature verification for the jurisdiction component module and use of an output therefrom for verifying a keyed hash.

Steps 294-299 in FIG. 25 illustrate the recovery of the value $K_{PUB-C}$ using the signature on the Jurisdiction Module and the value $K_{PUB-B}$, which was recovered from the Game End Module. The value $K_{PUB-C}$ is provided both as an input to the chain of recovery operations for the platform component 522, and to generate the HMAC at step 300 where the HMAC is stored at step 302 for later authenticating the platform module 522 when new game modules are downloaded. The HMAC is generated by hashing the contents of the platform module 522 with a keyed hash function 531 that uses a value derived from $K_{PUB-C}$ as the key (e.g. key=f($K_{PUB-C}$)). The HMAC may be generated in parallel with the verification chain for the platform component 522 (as shown), may be generated before proceeding with the chain for the platform component 522, or may be done at the end of the boot authentication procedure.

If game code included in the game component 518 has been tampered with, the wrong key $K_{PUB-C}$ would have been recovered during the chain of recovery operations on the modules of the game component 518 illustrated and described above. Similarly, if the contents of the platform component 522 have been tampered with, even if the correct value $K_{PUB-C}$ is recovered, the HMAC will not be the same as a similar HMAC that is typically kept by the appropriate gaming authority when installing and upgrading the gaming machine 500. However, if the remaining steps in the chain do not produce an authentic output (indicating an authentic hardware board 506) the HMAC would be incorrect but would not be needed in any event since the gaming machine 500 would have to be shut down to correct the problem in such a scenario.

Figure 26:
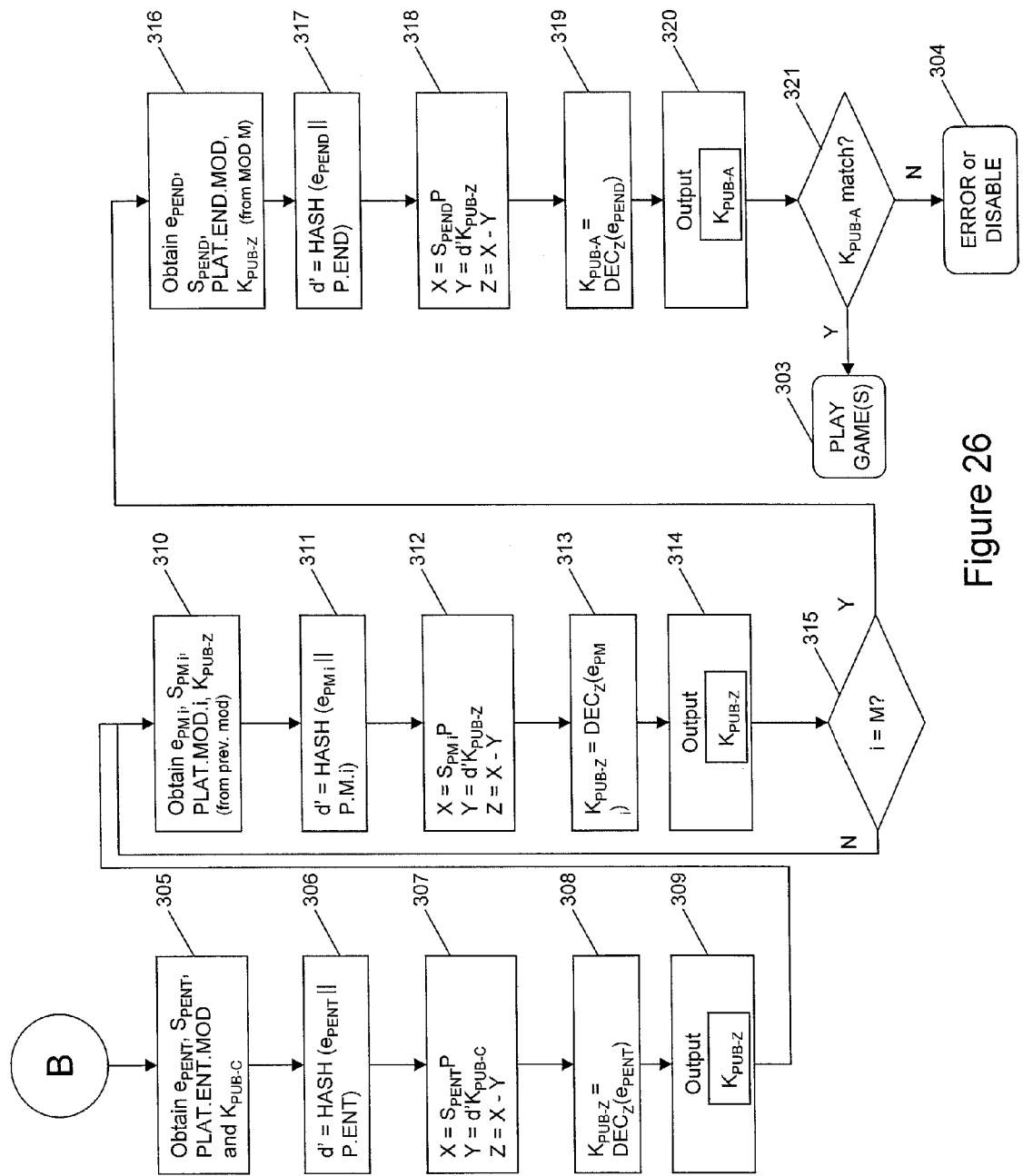
FIG. 26 is a flow diagram illustrating signature verification for the platform component modules.

Referring now to FIG. 26, the recovered value $K_{PUB-C}$ is then used to recover $K_{PUB-Z}$ from the Platform Entry Module in steps 305 to 309. This is done by obtaining the signature components $e_{PENT}$ and $s_{PENT}$ and the contents of the Platform Entry Module. The value $K_{PUB-Z}$ is recovered from the component $e_{PENT}$ at step 308 and output at step 309 for use in the next verification in the sequence. In steps 310 to 3315, the value $K_{PUB-Z}$ is used to recover the next $K_{PUB-Z}$ for use in the chain. When all of the other modules 532 have been operated on, the final version of $K_{PUB-Z}$ that is recovered from the signature on Platform Module M is fed into the recovery function 528 to enable recovery of the value $K_{PUB-A}$ using steps 316 to 320. The output $K_{PUB-A}$ is then compared to the $K_{PUB-A}$ stored in the BIOS OTP ROM 514 at step 321 to authenticate the hardware board 506. If the values match, then the boot sequence has been successful, and the games can be played and normal runtime operations may commence at step If the output $K_{PUB-A}$ does not match the value stored in ROM 514 then this indicates that one or more of the modules in one or more of the components has been compromised, tampered with or corrupted in some way. This may then initiate an error or disable function at step 304 to cease operation of the laming machine 500.

As noted above, in this embodiment, during runtime, new game files 512 can be downloaded to the gaming machine 500. When a new game file 512 is downloaded, a new module 532 is inserted and is verified before proceeding with allowing such a game to be played.

Figure 27:
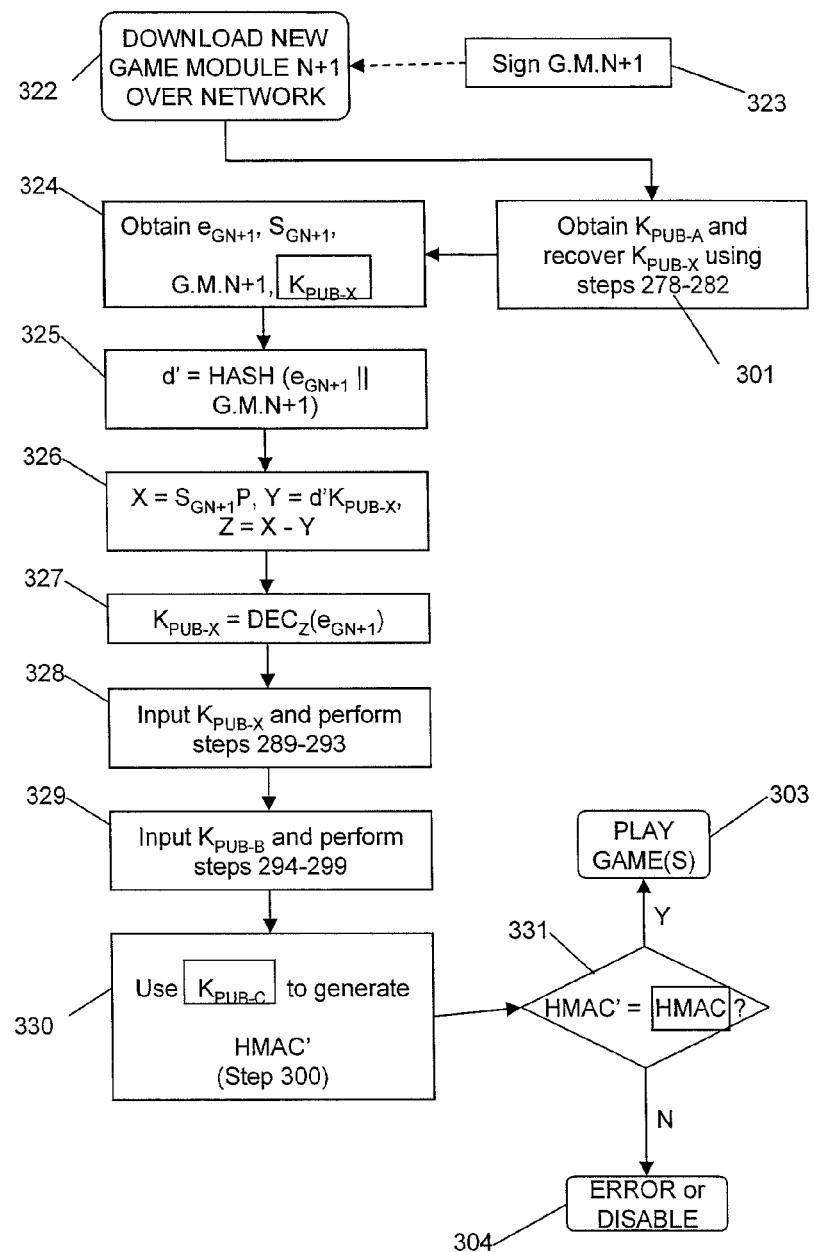
FIG. 27 is a flow diagram illustrating signature verification for a newly downloaded game file.

FIG. 27 shows a procedure for authenticating a new game file 512 once it has been downloaded at step 322. It will be appreciated that the new game module, if authentic, would include a signature with the game and thus the new game file 512 should already be signed at 323. Although the gaming machine 500 may be programmed to be responsible for signing each new game as it arrives, typical gaming regulations would not permit this and would require a trusted third party (e.g. the gaming authority or a CA therefor) to sign and make the new game file 512 available to the gaming machines 500.

At step 301, the value $K_{PUB-A}$ is read from the ROM 516 and used with the signature for the Game Entry Module to recover $K_{PUB-X}$ according to steps 278-282 described above. The other modules 532 may be skipped and the value $K_{PUB-X}$ used to immediately recover $K_{PUB-X}$ from the new Came Module N+1.

The value $K_{PUB-X}$ recovered from the Game Entry Module is used with the signature components for the New Game Module N+1 obtained at step 324, to generate the intermediate component d' at step 325. Steps 326-328 are then performed to recover $K_{PUB-X}$, which is then used at step 328 to recover $K_{PUB-C}$ from the Game End Module according to steps 289-293.

Now that $K_{PUB-C}$ has been re-recovered from the Jurisdiction Module, it can then be used to compute a hash verify value HMAC' at step 330. As when generating the HMAC at boot up, the value $K_{PUB-C}$ is used to derive the key for the keyed hash function 530 that is applied to the contents of the platform module 522 as it currently exists and then removed from memory after the HMAC has been created. At step 331, the values HMAC' and the stored HMAC are compared. If there is a match, the gaming machine 500 can continue operation at step 303. If there is not a match, then either the New Game Module is corrupt or the contents of the platform module 522 have been tampered with since the boot up sequence. This indicates a problem with the gaming machine 500 and an error or disable function is executed at step 304.

Accordingly, new game files 151 can be downloaded and added to the game component 518 without rebooting the system and without reconfiguring the chain of signatures. Only the entry and end modules 533 and 534 of the game component 518 need to be operated on again and the other modules 532 can be skipped. By storing the HMAC at boot up, the chain sequence for the platform component 522 does not need to be performed in order to authenticate the entire contents of the hardware board 506 when new games are added. This is also possible since the HMAC is computed using an intermediate key and only the recovery of the intermediate key is needed to create the value HMAC'. In this example, the signature oil the Jurisdiction Module is used to recover the intermediate key $K_{PUB-C}$ and to obtain the input for this operation, the encrypted portion of the signature for the Game End Module needs to be recovered.

Figure 24:
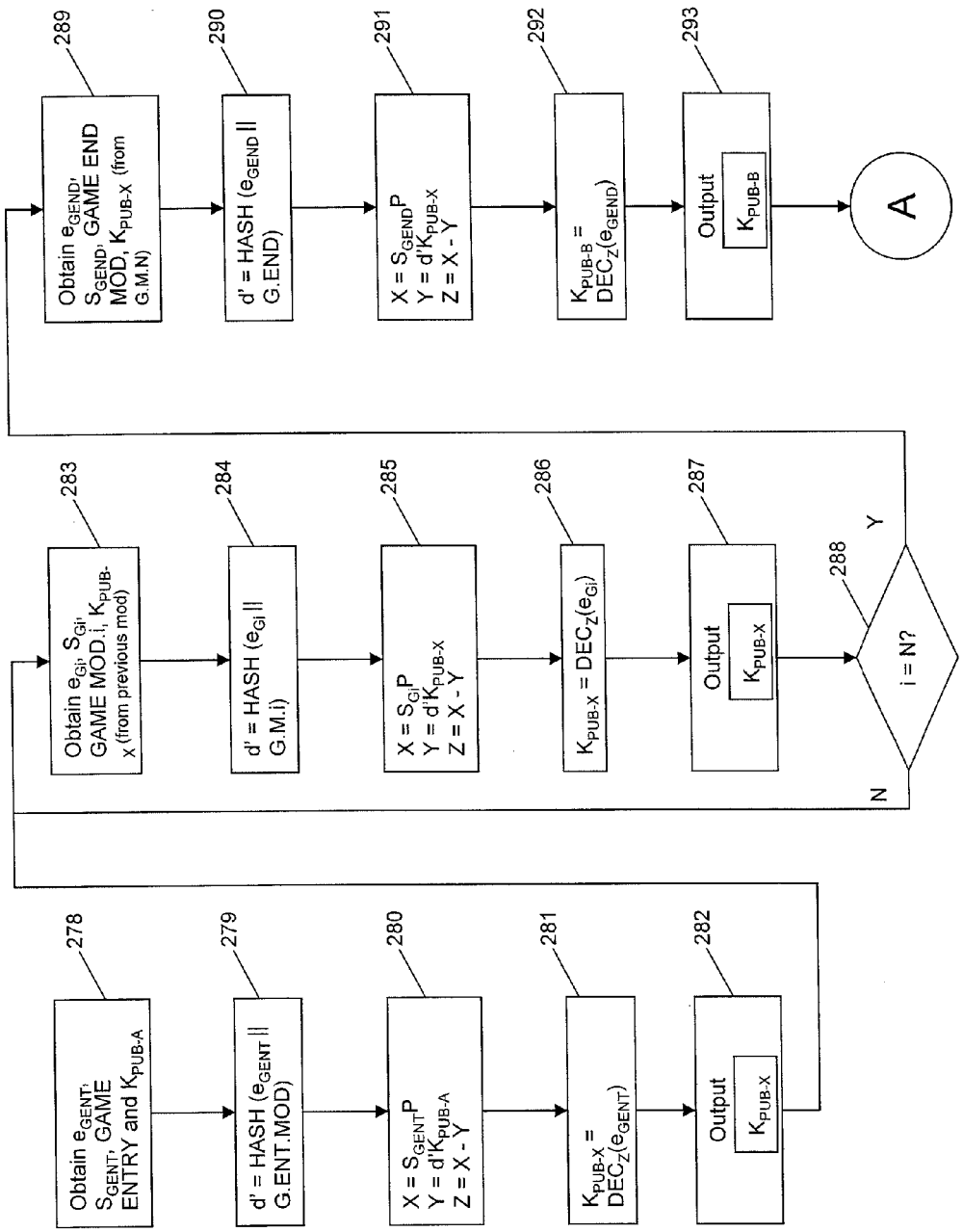
FIG. 24 is a flow diagram illustrating signature verification for the game component modules.

An alternative to the verification chain shown in FIGS. 24-26 would be to use the value $K_{PUB-A}$ as the input for each and every module other than the end module 534. This would avoid having to target a specific entry module 533 but would not link the inputs and outputs for each module 532 in the same way. As such, although each module 532 can be signed using $K_{PUB-A}$, the example described herein is preferable as corruption of any module would propagate through the chain resulting in the output not authenticating.

There are several alternatives to the download verification procedure shown in FIG. 27, the choice of which could be used would depend on the nature of the application. The procedure shown herein skips recovery of the values $K_{PUB-X}$ from the signatures on the other modules 532 and skips recovery of the values $K_{PUB-B}$, $K_{PUB-Z}$ and $K_{PUB-A}$ from the signatures on the platform modules, by storing the HMAC and recovering $K_{PUB-C}$ to authenticate the HMAC stored in memory 516. This avoids a complete reboot of the gaming machine 500. In a gaming environment, rebooting every time a new game is downloaded is undesirable, especially where a generic gaming machine 500 downloads new games nearly every time it is run. In other applications where a reboot is not as undesirable, the verification agent 526 could forego generating the HMAC at boot up and simply re-authenticate the entire content of the hardware board 506 (with the new Game Module N+1 inserted after the Game Module N) each and every time a new game is added. Other alternatives include skipping the other game modules 532 as shown in FIG. 27 but not using the HMAC and simply continuing with recovery of the values for the remainder of the chain, or skipping the other game modules 532 while still using the HMAC to later authenticate the platform component 522.

Figure 28:
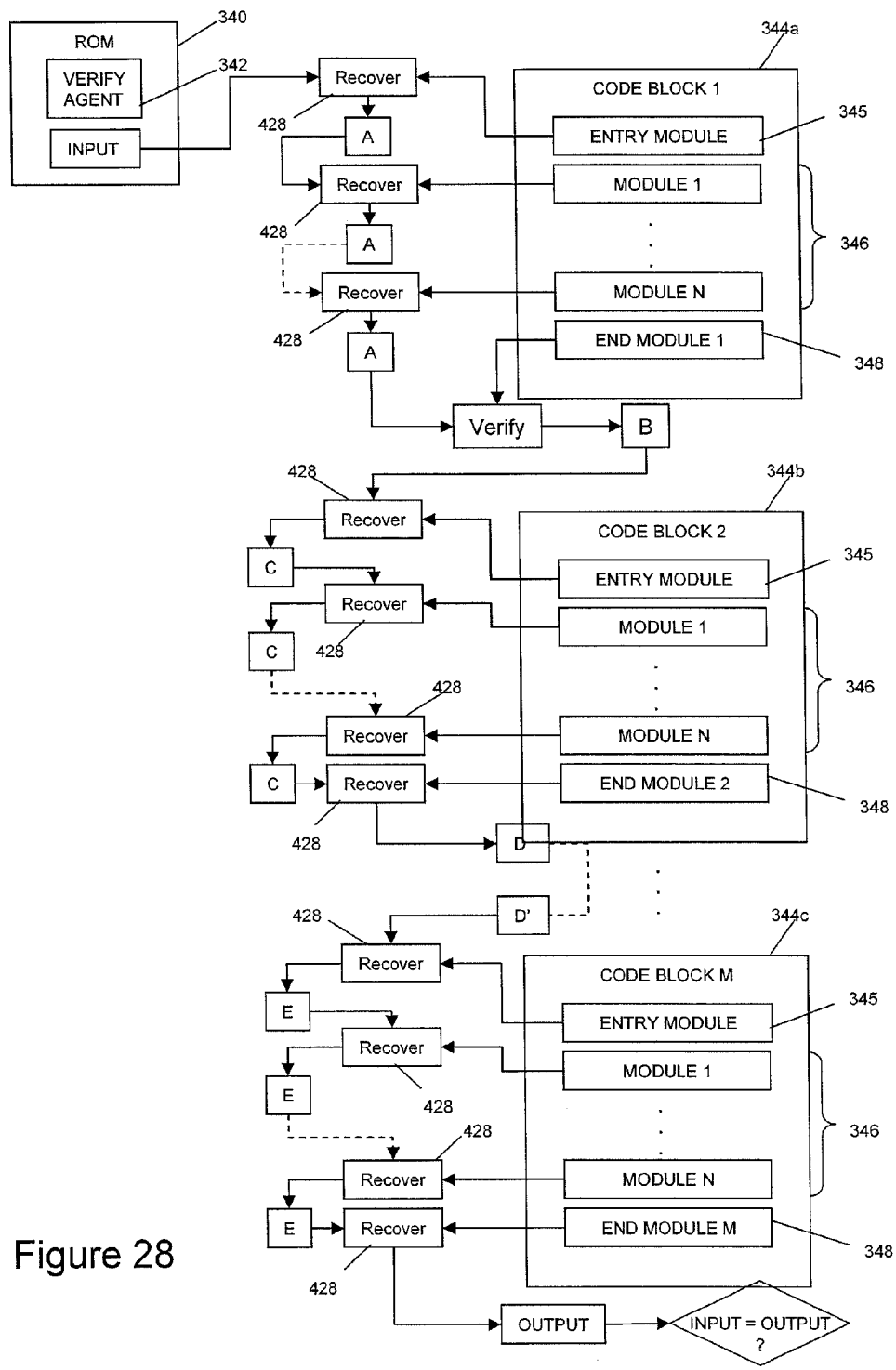
FIG. 28 is a flow diagram showing a chained signature verification procedure for an arbitrary file system.

A general embodiment is shown in FIG. 28 for authenticating one or more code blocks 344 in a computer-based system comprising data that is to be secured and then authenticated at some other time, according to the principles discussed above. Each of the one or more portions of content or code blocks 344 has an entry module 345, end module 348 and one or more other modules 346, or, similar to the Jurisdiction Module, may have only one module therein. It will be appreciated that any of the code blocks 344 may also have two modules and thus only an entry and end module 345, 348. A chained verification sequence may be employed to authenticate the contents of the entire system implicitly and at the same time, by feeding the output of one component into an input to the next component and comparing an output to the original input when the entire chain sequence has been performed.

The system shown in FIG. 28 includes a ROM 340 which contains a verification agent 342 for performing the chained verification sequence, and the Input. As can be seen, the Input is used to recover a value A from the Entry Module in Code Block 1 by operating the recovery function 528 (for performing a message recovery operation—e.g. using ECPVS), which is then used to recover A from every other module 346. The value A is then used to recover B from the End Module, which is then used in the chain for the next component, Code Block 2. The value B is used to recover a value C from the Entry Module in Code Block 2, which is then used to recover C from each and every other module 346. The value C is then used to recover a value D from the End Module. The value D is then fed into the next code block 344 and ultimately, a value D' is used in the final Code Block M to recover a value E. Value E is used to recover value E from every other module 346 in Code Block M, and then to recover the output from the End Module in Code Block M.

It can be seen that, in the general embodiment, the use of a recovery function 528 that permits one to specify the recoverable portion, which then enables one to predictably sign each module such that they can be linked to each other in a chain where the final Output is used to authenticate the entire system. The Output will be incorrect and not match the Input if any of the modules are compromised since the proper value will only be recovered if the proper inputs are used. By chaining the modules, any compromised code will cause incorrect values to propagate through the chain and the Output will be rejected. The chained verification described herein thus implicitly authenticates every code block 344 and every module therein based on the comparison of the Output to the Input at the end of the chain. This also enables all code blocks 344 to be authenticated at the same time.

It will be appreciated that the generic embodiment shown in FIG. 28 can also utilize a keyed hash (e.g. HMAC) to enable the efficiencies exemplified in the example for authenticating the gaming machine 500. It will also be appreciated that the general embodiment may utilize the same principles on a plurality of code blocks 344 that each include only a single module wherein the value recovered from a signature for that one module is used as an input for recovering another value from the next module in the next code block. It can therefore be seen that the chained signature verification procedures shown herein can be adapted to suit numerous file structures and data storage schemes such that the recovered value from a signature on one code block is used as an input to a verification function on the signature of the next code block, to recover another value. The chain is built to include every code block that is desired to be protected and the final recovered output should be the same as the input for an authentic set of data.

Although the invention has been described with reference to certain specific embodiments, various modifications thereof will be apparent to those skilled in the art.

The invention claimed is:

1. A method for securing content for use in operating a device, the method comprising:

designating a first content portion and a second content portion;

storing a first value on said device;

generating a first signature on said first content portion, said first signature comprising a first signature component which encrypts a second value such that said first value is required to decrypt said second value from said first signature component;

generating a second signature on said second content portion, said second signature comprising a second signature component which encrypts said second value such that said second value encrypted in said second signature component is required to decrypt said second value encrypted in said second signature component; and if a third content portion is added to said device, generating a third signature on said third content portion, said third signature comprising a third signature component which encrypts said second value such that said second value recovered from said signature component is required to decrypt said second value encrypted in said third signature component.

2. The method according to claim 1 wherein each said signature is an Elliptic Curve Pintsov-Vanstone (ECPV) signature with the respective portion being a visible message, and with the respective one of said values being a hidden portion in accordance with an ECPV protocol, wherein the first and second values are sued to generate decryption keys for recovering the hidden portions.

3. The method according to claim 1 wherein said device comprises a hardware board having a BIOS and a hard disk, the hard disk comprising said content portions.

4. The method according to claim 3 comprising storing said first value in said BIOS.

5. The method according to claim 1, further comprising:
designating said first content portion as an entry module in a component comprising said first and second content portions, wherein said first value is obtained from said device;
designating either said third content portion or another content portion added to said device as an end module in said component, wherein a signature on said end module encrypts an intermediate value such that said second value recovered from a corresponding signature component of a previous signed content portion is required to decrypt said intermediate value; and
providing said intermediate value to be used as a new first value for another component used in operating said device.

6. The method according to claim 1 wherein said device is a gaming machine.

7. The method according to claim 1, further comprising generating a component manifest indicating in which order content portions other than said first content portion are to be verified, wherein if said third content portion is added, said component manifest is updated.

8. The method according to claim 1, further comprising generating an authentication code using said content and storing said authentication code in memory for later comparison during a boot-up procedure.

9. The method according to claim 8, wherein said authentication code is generated by applying a keyed-hash function to said content.

10. A method for authenticating content to be used in operating a device, the method comprising:
obtaining a first value stored on said device;
obtaining a first signature on a first content portion, said first signature comprising a first signature component which encrypts a second value such that said first value is required to decrypt said second value from said first signature component;
recovering said second value by decrypting said first signature component using said first value;
obtaining a second signature on a second content portion, said signature comprising a second signature component which encrypts said second value such that said second value recovered from said first signature component is required to decrypt said second value encrypted in said second signature component;
recovering said second value encrypted in said second signature component by decrypting said second signature component using said second value recovered from said first signature component;
if one or more third content portions have been added to said device, obtaining one or more third signatures comprising respective signature components which encrypt said second value such that said second value recovered from a previous signature component is required to decrypt said second value encrypted in said respective signature component, and recovering said second value encrypted in said respective signature component by decrypting said respective signature component; and
authenticating said content by comparing a final value recovered from a signature component on a last of said second or one or more third content portions with a stored value.

11. The method according to claim 10 wherein each said signature is an Elliptic Curve Pintsov-Vanstone (EPCV) signature with the respective content portion being a visible message, and with the respective one of said values being a hidden portion in accordance with an ECPV protocol, wherein the first and second values are used to generate decryption keys for recovering the hidden portions.

12. The method according to claim 10 wherein said device comprises a hardware board having a BIOS and a hard disk, the hard disk comprising said content portions.

13. The method according to claim 12 obtaining said first value from said BIOS.

14. The method according to claim 10, further comprising:
obtaining said first value from said device, wherein said first content portion has been designated as a entry module in a component comprising said content portions; and
providing said final value to be used as a new first value for another component used in operating said device, wherein said last of said content portions has been designated as an end module in said component, wherein said signature component on said last of said content portions encrypts said final value such that said second value recovered from a corresponding signature component of a previous signed content portion is required to decrypt said final value.

15. The method according to claim 14, further comprising utilizing a selected one of said values to derive a key for a keyed hash function, and applying said keyed hash function to one of said components to obtain an authentication code to be used to authenticate said one of said components subsequently.

16. The method according to claim 10, further comprising utilizing a selected one of said values to derive a key for a keyed hash function, and applying said keyed hash function to one of said components to obtain an authentication code to be used to authenticate said one of said components subsequently.

17. The method according to claim 10 wherein said device is a gaming machines.

18. The method according to claim 10, further comprising using a component manifest to determine in which order content portions other than said first content portion are to be verified, wherein if said one or more third content portions have been added, said component manifest is updated.

19. The method according to claim 10, further comprising generating an authentication code on said content and comparing said authentication code to a stored authentication code.

20. The method according to claim 19, wherein said authentication code is generated by applying a keyed-hash function to said content.

21. A method for downloading a new content portion to be added to content used in operating a device, said method comprising:
obtaining a first signature on a first content portion used in operating said device, said first signature comprising a signature component which encrypts an intermediate value such that said intermediate value can be recovered using a value stored on said device;
recovering said intermediate value from said first signature on said first content portion using said value stored on said device;

obtaining a second signature on said new content portion, said second signature comprising a second signature component which encrypts said intermediate value such that said intermediate value encrypted in said first content portion is required to decrypt said intermediate value encrypted in said second signature component;

using said intermediate value recovered from said first signature to decrypt said intermediate value encrypted in said second signature component;

obtaining a third signature on a second content portion, said third signature comprising a third signature component which encrypts a next value such that said intermediate value encrypted in said second content portion is required to decrypt said next value encrypted in said third signature component;

using said intermediate value recovered from said second signature component to decrypt said next value from said third signature component;

using said next value as a key for a keyed hash function, and applying keyed hash function to another content portion to obtain an authentication code; and comparing said authentication code to a stored authentication code previously generated using said other component to authenticate said new content portion.

22. A non-transitory computer readable medium comprising computer executable instruction for securing content for use in operating a device, the computer executable instruction comprising instructions for:

designating a first content portion and a second content portion;

storing a first value on said device;

generating a first signature on said first content portion, said signature comprising a first signature component which encrypts a second value such that said first value is required to decrypt said second value from said first signature component;

generating a second signature on said second content portion, said second signature comprising a second signature component which encrypts said second value such that said second value encrypted in said second signature component is required to decrypt said second value encrypted in said second signature component; and if a third content portion is added to said device, generating a third signature on said third content portion, said third signature comprising a third signature component which encrypts said second value such that said second value recovered from said signature component is required to decrypt said second value encrypted in said third signature component.

23. The non-transitory computer readable medium according to claim 22, wherein each signature is an Elliptic Curve Pintsov-Vanstone (ECPV) signature with the respective content portion being a visible message, and the respective one of said values being a hidden portion in accordance with an ECPV protocol, wherein the first and second values are used to generate decryption keys for recovering the hidden portions.

24. The non-transitory computer readable medium according to claim 22, wherein said device comprises a hardware board having a BIOS and a hard disk, the hard disk comprising said content portions.

25. The non-transitory computer readable medium according to claim 24, further comprising instructions for storing said first value in said BIOS.

26. The non-transitory computer readable medium according to claim 22, further comprising instructions for:

designating said first content portion as an entry module in component comprising said first and second content portions, wherein said first value is obtained from said device;

designating either said third content portion or another content portion added to said device as an end module in said component, wherein a signature on said end module encrypts an intermediate value such that said second value recovered from a corresponding signature component of a previous signed content portion is required to decrypt said intermediate value; and providing said intermediate value to be used as a new first value for another component used in operating said device.

27. The non-transitory computer readable medium according to claim 22, wherein said device is a gaming machine.

28. The non-transitory computer readable medium according to claim 22, further comprising instructions for generating a component manifest indicating in which order content portions other than said first content portion are to be verified, wherein if said third content portion is added, said component manifest is updated.

29. The non-transitory computer readable medium according to claim 22, further comprising instructions for generating an authentication code using said content and storing said authentication code in memory for later comparison during a boot-up procedure.

30. The non-transitory computer readable medium according to claim 29, wherein said authentication code is generated by applying a keyed-hash function to said content.

31. A non-transitory computer readable medium comprising computer executable instructions for authenticating content to be used in operating a device, said computer executable instructions comprising instructions for:

obtaining a first value stored on said device;

obtaining a first signature on a first content portion, said signature comprising a first signature component which encrypts a second value such that said first value is required to decrypt said second value from said first signature component;

recovering said second value by decrypting said first signature component using said first value;

obtaining a second signature on a second content portion, said second signature comprising a second signature component which encrypts said second value such that said second value recovered from said fist signature component is required to decrypt said second value encrypted in said second signature component;

recovering said second value encrypted in said second signature component by decrypting said second signature component using said second value recovered from said first signature component;

if one or more third content portion have been added to said device, obtaining one or more third signatures comprising respective signature components which encrypt said second value such that said second value recovered from a previous signature component is required to decrypt said second value encrypted in said respective signature component, and recovering said second value encrypted in said respective signature component by decrypting said respective signature component; and authenticating said content by comparing a final value recovered from a signature component on a last of said second or one or more third content portions with a stored value.

32. The non-transitory computer readable medium according to claim 31, wherein each signature is an Elliptic Curve Pintsov-Vanstone (ECPV) signature with the respective content portion being a visible message, and with the respective one of said values being a hidden portion in accordance with an ECPV protocol, wherein the first and second values are used to generate decryption keys for recovering the hidden portions.

33. The non-transitory computer readable medium according to claim 31, wherein said device comprises a hardware board having a BIOS and a hard disk, the hard disk comprising said content portions.

34. The non-transitory computer readable medium according to claim 33, further comprising instructions for obtaining said first value from said BIOS.

35. The non-transitory computer readable medium according to claim 31, further comprising instructions for:
obtaining said first value from said device, wherein said first content portion has been designated as an entry module in a component comprising said content portions; and
providing said final value to be used as a new first value for another component used in operating said device, wherein said last of said content portions has been designated as an end module in said component, wherein said signature component on said last of said content portions encrypts said final value such that said second value recovered from corresponding signature component of a previous singed content portion is required to decrypt said final value.

36. The non-transitory computer readable medium according to claim 35, further comprising instructions for utilizing a selected one of said values to derive a key for a keyed hash function, and applying said keyed hash function to one or said components to obtain an authentication code to be used to authenticate said one of said components subsequently.

37. The non-transitory computer readable medium according to claim 31, further comprising instructions for utilizing a selected one of said values to derive a key for a keyed hash function, and applying said keyed hash function to one of said components to obtain an authentication code to be used to authenticate said one of said components subsequently.

38. The non-transitory computer readable medium according to claim 31, wherein said device is a gaming machine.

39. The non-transitory computer readable medium according to claim 31, further comprising instructions for using a component manifest to determine in which order content portions other than said first content portion are to be verified, wherein if said one or more third content portions have been added, said component manifest is updated.

40. The non-transitory computer readable medium according to claim 31, further comprising instructions for generating an authentication code on said content and comparing said authentication code to a stored authentication code.

41. The non-transitory computer readable medium according to claim 40, wherein said authentication code is generated by applying a keyed-hash function to said content.

42. A non-transitory computer readable medium comprising computer executable instructions for:
downloading a new content portion to be added to content used in operating a device, said computer executable instructions comprising instructions for:
obtaining a first signature on a first content portion used in operating said device, said first signature comprising a signature component which encrypts an intermediate value such that said intermediate value can be recovered using a value stored on said device;
recovering said intermediate value from said first signature on said first content portion using said value stored on said device;
obtaining a second signature on said new content portion, said second signature comprising a second signature component which encrypts said intermediate value such that said intermediate value encrypted in said first content portion is required to decrypt said intermediate value encrypted in said second signature component;
using said intermediate value recovered from said first signature to decrypt said intermediate value encrypted in said second signature component;
obtaining a third signature on a second content portion, said third signature comprising a third signature component which encrypts a next value such that said intermediate value encrypted in said second content portion is required to decrypt said next value encrypted in said third signature component;
using said intermediate value recovered from said second signature component to decrypt said next value from said third signature component;
using said next value as a key for a keyed hash function, and applying said keyed hash function to another content portion to obtain an authentication code; and
comparing said authentication code to a stored authentication code previously generated using said other component to authenticate said new content portion.

43. A device comprising a processor and a memory, said processor operable for securing content stored in said memory for use in operating said device by executing computer executable instructions comprising instruction for:
designating a first content portion and a second content portion;
storing a first value on said device;
generating a first signature on said first content portion, said first signature comprising a first signature component which encrypts a second value such that said first value is required to decrypt said second value from said first signature component;
generating a second signature on said second content portion, said second signature comprising a second signature component with encrypts said second value such that said second value encrypted in said second signature component is required to decrypt said second value encrypted in said second signature component; and
if a third content portion is added to said device, generating a third signature on said third content portion, said third signature comprising a third signature component which encrypts said second value such that said second value recovered from said signature component is required to decrypt said second value encrypted in said third signature component.

44. The device according to claim 43, wherein each signature is an Elliptic Curve Pintsov-Vanstone (ECPV) signature with the respective content portion being a visible message, and the respective one of said values being a hidden portion in accordance with and ECPV protocol, wherein the first and second values are used to generate decryption keys for recovering the hidden portions.

45. The device according to claim 43, wherein said device further comprises a hardware board having a BIOS and a hard disk, the hard disk comprising said content portions.

46. The device according to claim 45, wherein the device is further operable to execute instructions comprising instructions for storing said first value in said BIOS.

47. The device according to claim 43, wherein the device is further operable to execute instructions comprising instructions for:
  designating said first content portion as an entry module in a component comprising said first and second content portions, wherein said first value is obtained from said device;
  designating either said third content portion or another content portion added to said device as an end module in said component, wherein a signature on said end module encrypts an intermediate value such that said second value recovered from a corresponding signature component of a previous signed content portion is required to decrypt said intermediate value; and
  providing said intermediate value to be used as a new first value for another component used in operating said device.

48. The device according to claim 43, wherein said device is a gaming machine.

49. The device according to claim 43, wherein the device is further operable to execute instructions comprising instructions for generating a component manifest indicating in which order content portions other than said first content portion are to be verified, wherein if said third content portion is added, said component manifest is updated.

50. The device according to claim 43, wherein the device is further operable to execute instructions comprising instructions for generating an authentication code using said content and storing said authentication code in memory for later comparison during a boot-up procedure.

51. The device according to claim 50, wherein said authentication code is generated by applying a keyed-hash function to said content.

52. A device comprising a processor and a memory, said processor operable for authenticating content to be used in operating said device by executing computer executable instructions comprising instructions for:
  obtaining a first value stored on said device;
  obtaining a first signature on a first content portion, said first signature comprising a first signature component which encrypts a second value such that said first value is required to decrypt said second value from said first signature component;
  recovering said second value by decrypting said first signature component using said first value;
  obtaining a second signature on a second content portion, said second signature comprising a second signature component which encrypts said second value such that said second value recovered from said first signature component is required to decrypt said second value encrypted in said second signature component;
  recovering said second value encrypted in said signature component by decrypting said second signature component using said second value recovered from said first signature component;
  if one or more third content portions have been added to said device, obtaining one or more third signatures comprising respective signature components which encrypt said second value such that said second value recovered from a previous signature component is required to decrypt said second value encrypted is said respective signature component, and recovering said second value encrypted in said respective signature component by decrypting said respective signature component; and
  authenticating said content by comparing a final value recovered from a signature component on a last of said second or one or more third content portions with a stored value.

53. The device according to claim 52, wherein each signature is an Elliptic Curve Pintsov-Vanstone (ECPV) signature with the respective content portion being a visible message, and with the respective one of said values being a hidden portion in accordance with an ECPV protocol, wherein the first and second values are used to generate decryption keys for recovering the hidden portions.

54. The device according to claim 52, wherein said device further comprises a hardware board having a BIOS and a hard disk, the hard disk comprising said content portions.

55. The device according to claim 54, wherein the device is further operable to execute instructions comprising instructions for obtaining said first value from said BIOS.

56. The device according to claim 52, wherein the device is further operable to execute instructions comprising instructions for:
  obtaining said first value from said device, wherein said first content portion has been designated as an entry module in a component comprising said content portions; and
  providing said final value to be used as a new first value for another component used in operating said device, wherein said last of said content portions has been designated as an end module in said component, wherein said signature component on said last of said content portions encrypts said final value such that said second value recovered from a corresponding signature component of a previous signed content portion is required to decrypt said final value.

57. The device according to claim 56, wherein the device is further operable to execute instructions comprising instructions for utilizing a selected one of said values to derive a key for a keyed hash function, and applying said keyed hash function to one of said components to obtain an authentication code to be used to authenticate said one of said components subsequently.

58. The device according to claim 52, wherein the device is further operable to execute instructions comprising instructions for utilizing a selected one of said values to derive a key for a keyed hash function, and applying said keyed hash function to one of said components to obtain an authentication code to be used to authenticate said one of said components subsequently.

59. The device according to claim 52, wherein said device is a gaming machine.

60. The device according to claim 52, wherein the device is further operable to execute instructions comprising instructions for using a component manifest to determine in which order content portions other than said first content portion are to be verified, wherein if said one or more third content portions have been added, said component manifest is updated.

61. The device according to claim 52, wherein the device is further operable to execute instructions comprising instructions for generating an authentication code on said content and comparing said authentication code to a stored authentication code.

62. The device according to claim 61, wherein said authentication code is generated by applying a keyed-hash function to said content.

63. A device comprising a processor and a memory, said processor operable for downloading a new content portion to be added to content used in operating said device by executing computer executable instructions comprising instructions for:

obtaining a first signature on a first content portion used in operating said device, said first signature comprising a signature component which encrypts an intermediate value such that said intermediate value can be recovered using a value stored on said device;

recovering said intermediate value from said first signature on said first content portion using said value stored on said device;

obtaining a second signature on said new content portion, said second signature comprising a second signature component which encrypts said intermediate value such that said intermediate value encrypted in said first content portion is required to decrypt said intermediate value encrypted in said second signature component;

using said intermediate value recovered from said first signature to decrypt said intermediate value encrypted in said second signature component;

obtaining a third signature on a second content portion, said third signature comprising a third signature component which encrypts a next value such that said intermediate value encrypted in said second content portion is required to decrypt said next value encrypted in said third signature component;

using said intermediate value recovered from said second signature component to decrypt said next value from said third signature component;

using said next value as a key for a keyed hash function, and applying said keyed hash function to another content portion to obtain an authentication code; and comparing said authentication code to be stored authentication code previously generated using said other component to authenticate said new content portion.

* * * * *